(12) United States Patent
Cheng et al.

(10) Patent No.: US 11,222,629 B2
(45) Date of Patent: *Jan. 11, 2022

(54) MASTERBOT ARCHITECTURE IN A SCALABLE MULTI-SERVICE VIRTUAL ASSISTANT PLATFORM

(71) Applicant: Linc Global, Inc., Sunnyvale, CA (US)

(72) Inventors: Fang Cheng, Mountain View, CA (US); Dennis Wu, Palo Alto, CA (US); Jian Da Chen, Newark, CA (US)

(73) Assignee: Linc Global, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,783

(22) Filed: Jun. 7, 2021

(65) Prior Publication Data

US 2021/0304740 A1  Sep. 30, 2021

Related U.S. Application Data

(63) Continuation of application No. 17/181,013, filed on Feb. 22, 2021, now Pat. No. 11,031,001, which is a
(Continued)

(51) Int. Cl.
*G10L 15/18* (2013.01)
*G06N 20/00* (2019.01)
(Continued)

(52) U.S. Cl.
CPC .... *G10L 15/1822* (2013.01); *G06F 16/90332* (2019.01); *G06F 40/205* (2020.01);
(Continued)

(58) Field of Classification Search
CPC .......................... G10L 15/1822; G10L 15/22
See application file for complete search history.

(56) References Cited

U.S. PATENT DOCUMENTS 9,189,742 B2  11/2015  London et al.
9,552,350 B2  1/2017  Brown et al.
(Continued)

OTHER PUBLICATIONS

V-Soft Consulting, "Understanding the Conversational Chatbot Architecture," V-SOFT Consulting website, Available at https://blog.vsoftconsulting.com/blog/understanding-the-architecture-of-conversational-chatbot, Last accessed Jun. 6, 2019.
(Continued)

*Primary Examiner* — Shaun Roberts
(74) *Attorney, Agent, or Firm* — American Patent Agency PC; Daniar Hussain

(57) ABSTRACT

The present invention is a masterbot architecture in a scalable multi-service virtual assistant platform that can construct a fluid and dynamic dialogue by assembling responses to end user utterances from two kinds of agents, information agents and action agents. A plurality of information agents obtain at least one information value from a parsed user input and/or contextual data. A plurality of action agents perform one or more actions in response to the parsed user input, the contextual data, and/or the information value. A masterbot arbitrates an activation of the plurality of information agents and the plurality of action agents. The masterbot comprises an action agent selector module to select an appropriate action agent; a prerequisite validator module to validate that one or more prerequisite conditions of the selected action agent have been met; and an action invocation module to perform one or more selected actions of the selected action agent.

20 Claims, 29 Drawing Sheets

Related U.S. Application Data continuation of application No. 16/853,527, filed on Apr. 20, 2020, now Pat. No. 10,930,273, which is a continuation of application No. 16/528,926, filed on Aug. 1, 2019, now Pat. No. 10,629,191.

(60) Provisional application No. 62/862,128, filed on Jun. 16, 2019.

(51) Int. Cl.
　　　*G06N 5/04*　　　(2006.01)
　　　*G06F 16/9032*　(2019.01)
　　　*H04L 12/58*　　(2006.01)
　　　*G10L 15/22*　　(2006.01)
　　　*G06F 40/205*　(2020.01)

(52) U.S. Cl.
　　　CPC .............. *G06N 5/04* (2013.01); *G06N 20/00* (2019.01); *G10L 15/18* (2013.01); *G10L 15/22* (2013.01); *H04L 51/02* (2013.01)

(56) References Cited

U.S. PATENT DOCUMENTS

| | | |
|---|---|---|
| 2004/0044516 A1 | 3/2004 | Kennewick et al. |
| 2016/0042735 A1* | 2/2016 | Vibbert .............. G10L 15/222 704/257 |
| 2017/0300831 A1 | 10/2017 | Gelfenbeyn et al. |
| 2018/0052664 A1 | 2/2018 | Zhang et al. |
| 2018/0053119 A1 | 2/2018 | Zeng et al. |
| 2018/0054464 A1 | 2/2018 | Zhang et al. |
| 2018/0054523 A1 | 2/2018 | Zhang et al. |
| 2018/0336045 A1* | 11/2018 | Badr .................. G06N 3/006 |
| 2019/0042988 A1 | 2/2019 | Brown et al. |
| 2019/0124020 A1 | 4/2019 | Bobbarjung et al. |
| 2019/0324553 A1 | 10/2019 | Liu et al. |
| 2020/0175118 A1* | 6/2020 | Mahajan ............. G06F 40/30 |

OTHER PUBLICATIONS

Open Web Technology, "Building a Chatbot Leveraging Artificial Intelligence Technologies," Open Web Technology website, Available at: https://openwt.com/en/cases/building-chatbot-leveraging-artificial-intelligence-technologies, Last accessed Jun. 6, 2019.

Flores, Roberto A., et al., "A Principled Modular Approach to Construct Flexible Conversation Protocols," pp. 1-15 in: Tawfik, Ahmed, et al., eds., "Advances in Artificial Intelligence," Proceedings of the 17th Conference of the Canadian Society for Computational Studies of Intelligence, Canadian AI 2004, London, Ontario, Canada, May 17-19, 2004.

Li, Xiujun, et al., "End-to-End Task-Completion Neural Dialogue Systems," Proceedings of the 8th International Joint Conference on Natural Language Processing, pp. 733-743, Taipei, Taiwan, Nov. 27-Dec. 1, 2017. Available at: arXiv:1703.01008v4 [cs.CL], Feb. 11, 2018.

Chandrayan, Pramod, "Understanding AI Chatbots, Challenges, Opportunities & Beyond." Medium, Apr. 15, 2019. Available at: https://towardsdatascience.com/understanding-ai-chatbots-challenges-opportunities-beyond-fb657fa3e0da, Last accessed Jul. 16, 2019.

\* cited by examiner

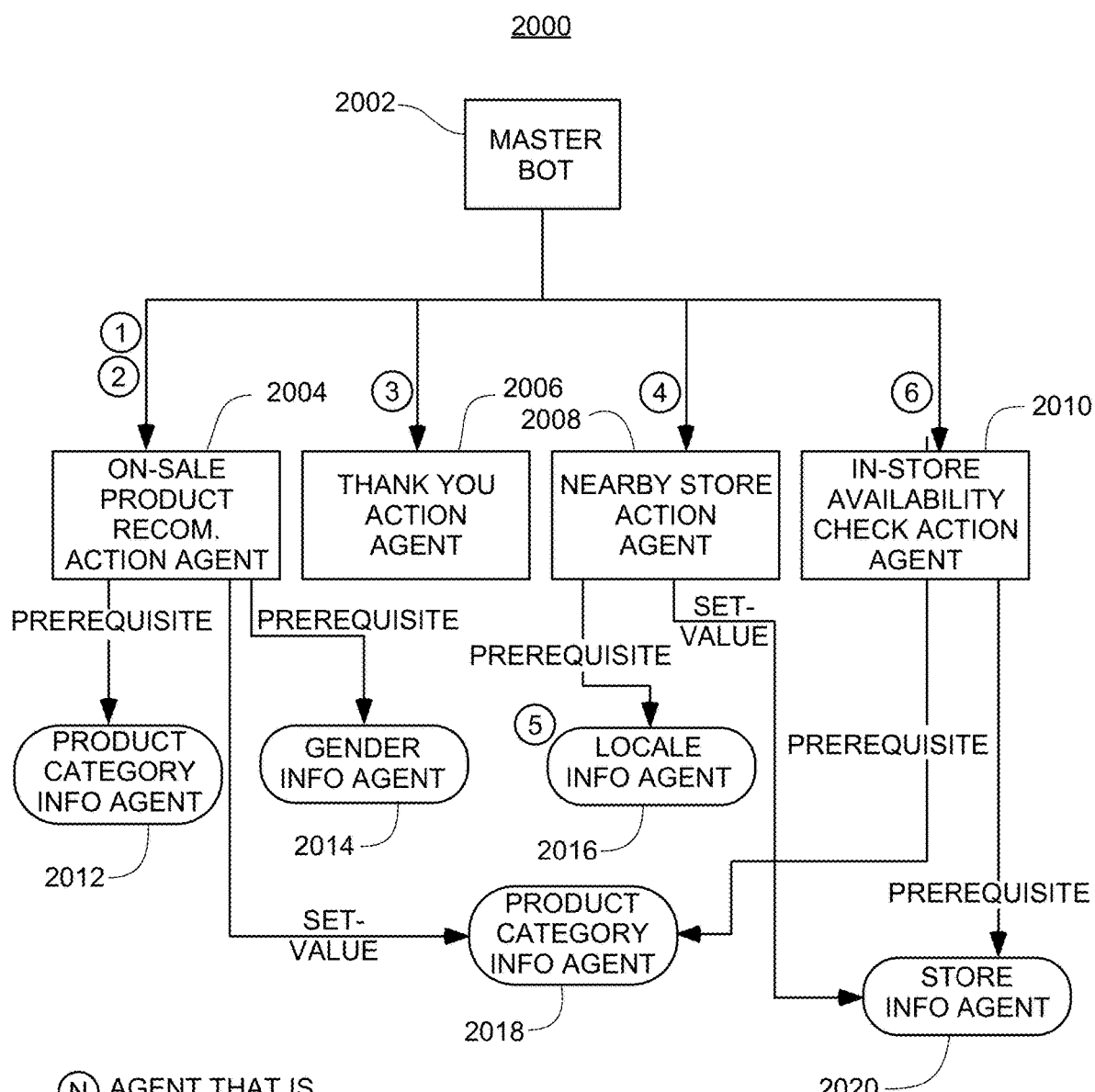

2900

MASTERBOT ARCHITECTURE IN A SCALABLE MULTI-SERVICE VIRTUAL ASSISTANT PLATFORM

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of natural language conversation systems and pertain particularly to methods and systems for deploying and managing a scalable multi-service virtual assistant platform that can construct fluid and dynamic dialogue with end users.

BACKGROUND OF THE INVENTION

The statements in this section may serve as a background to help understand the invention and its application and uses, but may not constitute prior art.

Conversational or natural language (NL) user interfaces (UIs) can include systems and methods that can rely upon textual, audio, and/or video inputs to allow end users to interact with computing systems using natural language. Performing natural language processing using a computing device can include interpreting human text or speech (e.g., a user's input received via text, speech, or video) utilizing one or more algorithms. In some examples, natural language user interfaces can serve to allow for richer and more fluid interactions between machines and humans than traditional interfaces or existing graphical user interfaces (GUIs), which primarily rely upon keyboard and mouse interactions.

Virtual assistant platforms that utilize conversational or natural language input from end users to automate business tasks have many business applications, including retail sales, customer order management, and many other types of customer service requirements across a range of industries. Conventional virtual assistant platforms implement natural language conversations with end users in one of several ways, either via decision trees or finite state machines, menu-driven approaches, frame-slot approaches, or machine learning on existing conversation datasets.

Firstly, decision trees or finite state machine approaches are highly rigid in their architecture and require extensive developer and subject matter expert development time, require an exponentially exploding tree or finite state machine table, and ultimately lead to a fragile system that results in end user frustration. Secondly, for multi-service conversation systems, traditional menu-driven approaches are similarly highly restrictive in their ability to handle natural conversations, are highly rigid in their conversations with end users, and also result in significant user frustrations. Frame-slot approaches to natural language conversations are also rigid, and similarly have not resulted in flexible conversation systems. Finally, more recent work on machine learning, and specifically deep learning, on existing conversation datasets has shown some promise, but has not led to successful commercial applications because the space of possible conversations corresponding to even a small set of business tasks explodes exponentially.

Therefore, in view of the aforementioned difficulties, there is an unsolved need to provide an enhanced virtual assistant platform and natural language interface for user interactions with computing systems that provides for a flexible and fluid conversation experience. In addition, it would be an advancement in the state of the art of natural language systems to provide systems and methods to enhance the experience of developers of such systems, such that an entire virtual assistant platform can be implemented by subject matter experts without relying on extensive programming or expensive software development efforts, in a matter of hours instead of months or years as compared to conventional approaches.

It is against this background that various embodiments of the present invention were developed.

BRIEF SUMMARY OF THE INVENTION

In one aspect, the present invention is a scalable multi-service virtual assistant platform that can construct a fluid and dynamic dialogue by assembling responses to end user utterances from two kinds of building blocks—information agents and action agents. The information agents and action agents are managed by a masterbot (also known as the arbiter agent).

In another aspect, the present invention is a virtual assistant platform, where the virtual assistant platform can develop new skills by getting instructions about a new service expressed in a form of prerequisites and action combinations. The virtual assistant platform automatically handles dialogue generation, arbitration, and optimization to survey prerequisites from the end user, and eventually handles the activation of appropriate action(s).

According to one aspect of the present invention, one benefit is decomposing services from the conversation layer. In one aspect, the present invention allows a large number of services to be implemented using a small number of building blocks—the information agents and action agents. These building blocks, also known as agents, can be used to assemble a much larger number of services. In turn, each service can be delivered through a large variety of conversations with end users, enabling a fluid and dynamic dialogue to be seamlessly implemented.

In one embodiment, each information agent is optimized to understand a small subset of information needed to handle a particular conversation with the end user. In one embodiment, the inference capability of each information agent is tied to other information agents. For example, an order number information agent may get the order number from a mention of a date of the order, or from the items in the order, which in turn are inferred by other information agents from user utterances. Therefore, a large number of services can be delivered through an even larger number of conversations, using just a small number of information agents.

In another aspect, the present invention provides for the separation of information and action. The information agents are modules that can be combined and reused, in order to obtain information from user utterances. In turn, action agents rely on information from the information agents, and activate or perform certain actions. For example, a given action agent might trigger a return slip to be generated when an end user wants to return an item in an order, and so forth.

In some embodiments of the present invention, the masterbot directly activates action agents, but as part of activating a given action agent, the masterbot first checks if there are any perquisites (in the form of prerequisite information agents), and if those information agents are not yet fulfilled, then the masterbot will in turn activate the necessary information agents.

Accordingly, some embodiments of the present invention relate to methods and systems for deploying and managing a scalable multi-service virtual assistant platform, which can be implemented, in some examples, for responding to end user utterances using natural language. In some aspects, a system, method, and apparatus for a multi-service virtual assistant platform is described. In one illustrative embodiment, the system can include at least one memory device that stores program code (or computer-executable instructions), and at least one processor configured to access the memory device. Further, the processor can be configured to execute the program code to implement: (1) a natural language understanding (NLU) module configured to receive one or more utterances from a user and generate parsed user input; (2) a plurality of information agents configured to obtain an information value from the parsed user input and/or contextual data; (3) a plurality of action agents configured to perform one or more actions in response to the parsed user input, the contextual data, and/or the information value; and (4) a masterbot for arbitrating an activation of the plurality of information agents and action agents to render a response back to the user.

In other aspects, a system, non-transitory storage medium, and method for a virtual assistant platform is described. In one illustrative embodiment, the system can include at least one memory device that stores program code, and at least one processor configured to access the memory device. Further, the processor can be configured to execute the program code to implement: (1) a plurality of information agents to obtain at least one information value from a parsed user input and/or contextual data from one or more contextual data sources, where the parsed user input is generated from one or more utterances received from a user; (2) a plurality of action agents to perform one or more actions in response to the parsed user input, the contextual data, and/or the at least one information value; and (3) at least one masterbot to arbitrate an activation of the plurality of information agents and the plurality of action agents. The masterbot includes (a) an action agent selector module to select an appropriate action agent; (b) a prerequisite validator module to validate that one or more prerequisite conditions of the selected action agent have been met, and to activate one or more information agents to obtain one or more information values when the one or more prerequisite conditions have not been met; and (c) an action invocation module to perform one or more selected actions of the selected action agent.

In some embodiments, at least one set-value connection interrelates a given action agent and a given information agent via at least one set-value action, wherein the set-value action for the given action agent is used to set an information value for the given information agent which is later used by the given information agent.

In some embodiments, at least one inference connection interrelates two information agents, wherein the inference connection interrelates the two information agents amongst themselves which determine when a given information agent activates one or more related information agents in order to fulfill one or more information values of the given information agent which are later used by the given information agent.

In some embodiments, at least one prerequisite connection interrelates at least one information agent and at least one action agent, and wherein the prerequisite connection activates one or more prerequisite information agents to fulfill one or more prerequisite conditions for a given action agent.

In some embodiments, at least one of the plurality of information agents is adapted to understand the parsed user input from the user to extract the information value directly from the parsed user input.

In some embodiments, at least one of the plurality of information agents is adapted to infer the information value from the parsed user input, wherein the inferring is activated in response to determining that a given information agent cannot obtain the information value by understanding the parsed user input directly.

In some embodiments, at least one of the plurality of information agents is adapted to infer the information value by accessing one or more contextual data sources for the contextual data and is adapted to infer the information value from the parsed user input and the contextual data.

In some embodiments, at least one of the plurality of information agents is adapted to query the user for the information value by generating a natural language query using a natural language generation (NLG) module, wherein the querying is activated in response to determining that the information agent cannot obtain the information value by understanding the parsed user input or inferring the information value.

In some embodiments, at least one of the plurality of information agents is adapted to obtain the information value by activating one or more other information agents, wherein the one or more other information agents are activated in response to determining that the at least one information agent cannot obtain the information value by understanding the parsed user input or inferring the information value.

In some embodiments, at least one of the plurality of action agents performs the one or more actions by triggering one or more internal services to perform one or more services.

In some embodiments, at least one of the plurality of action agents performs the one or more actions by accessing two or more Application Programming Interface (API) gateways to external services to perform the one or more services.

In some embodiments, the system activates one or more of the information agents in order to meet one or more prerequisite connections for a given action agent, wherein the given action agent utilizes the one or more activated information agents to obtain one or more information values needed to perform the one or more actions.

In some embodiments, at least one of the plurality of action agents is adapted to generate a natural language reply to the user using a natural language generation (NLG) module.

In some embodiments, at least one of the plurality of action agents is adapted to change a system state.

In some embodiments, the masterbot evaluates a performance of the plurality of information agents and the plurality of action agents using machine learning to adjust the activation of the information agents and the action agents.

In some embodiments, the masterbot generates a response to the user using a natural language generation (NLG) module from information supplied by the information agents and/or the action agents.

Yet other aspects of the present invention include methods, processes, and algorithms comprising the steps described herein, and also include the processes and modes of operation of the systems and servers described herein. Other aspects of the present invention include servers, devices, systems, and non-transitory storage medium which store executable program code, which when executed by at least one hardware processor, implement the methods, processes, and algorithms described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 20 shows a diagram illustrating a sample multi-service conversation operated by a masterbot and a plurality of info agents and action agents, in accordance with example embodiments of the disclosure;

Figure 1:
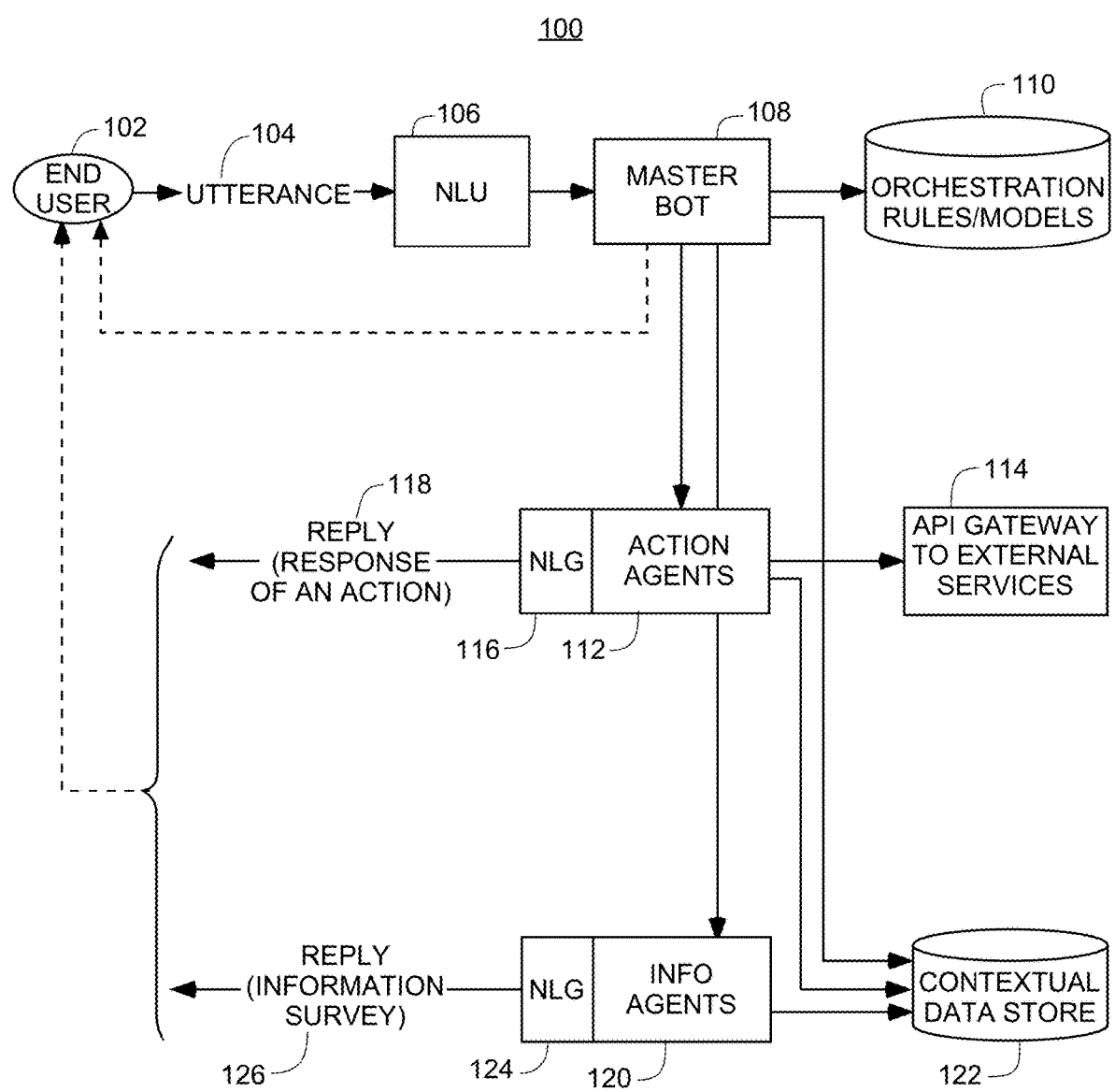
FIG. 1 shows a diagram illustrating a system architecture of a virtual assistant platform, in accordance with example embodiments of the disclosure.

vide a set of useful services, for example, answering a store hours question, checking a status for existing orders, exchanging a product, and so on.

"Virtual assistant," "chatbot," or "bot" is the virtual customer service agent with which the user is conversing, implemented using the virtual assistant platform.

"User" or "end user" refer to the users of the virtual assistant platform.

DETAILED DESCRIPTION OF THE INVENTION
Table of Contents for Detailed Description

| | |
|---|---|
| 1. Terminology and Introduction | 10 |
| 1.1 Terminology | 10 |
| 1.2 Introduction | 12 |
| 2. Overall System Architecture | 13 |
| 3. Overview of Building Blocks-Information Agents & Action Agents | 16 |
| 4. Information Agents | 17 |
| 4.1 Role of Information Agents | 17 |
| 4.2 Capability of Information Agents | 17 |
| 4.3 Building New Info Agents | 19 |
| 4.4 Examples of Information Agents | 19 |
| 4.4.1 Illustrative Understand Info Agent | 19 |
| 4.4.2 Illustrative Infer Info Agent | 20 |
| 4.4.3 Illustrative Survey Info Agent | 21 |
| 4.4.4 Three Types of Information Agents Summarized | 22 |
| 4.5 Inference Among Info Agents | 22 |
| 5. Action Agents | 23 |
| 5.1 Role of Action Agents | 23 |
| 5.2 How to Configure an Action Agent | 23 |
| 5.3 How Action Agents Work at Runtime | 25 |
| 5.4 Follow-up Action Agents | 27 |
| 6. Relationship Among Information and Action Agents | 28 |
| 6.1 Prerequisite Connection between Action Agent and Info Agent | 28 |
| 6.2 Set-Value Connection between Action Agent and Info Agent | 29 |
| 6.3 Follow-Up Connection among Action Agents | 29 |
| 6.4 Inference Connection among Info Agents | 30 |
| 7. Creating New Services Using Information and Action Agents | 30 |
| 7.1 Logical Form | 30 |
| 7.2 Basic Example | 31 |
| 7.3 Single Action, Standard Service Example | 32 |
| 7.4 Action Agent that Follows-up Another Action Agent | 32 |
| 7.5 Example-Single Service with Multiple Action Agents | 33 |
| 8. Service Orchestration and Anatomy of Conversation Building | 34 |
| 8.1 Role of the Masterbot | 34 |
| 8.2 Workflow of the Masterbot | 35 |
| 8.2.1 Action Agent Arbitration Process | 36 |
| 8.2.2 Action Agent Selection using Concept Ontology Classification | 38 |
| 8.2.3 Machine Learning Based Approach for Action Agent Triaging/Selection | 40 |
| 8.2.4 Optimal Info Agent Invocation via Inference-Based Selection Process | 41 |
| 8.3 Sample Multi-Service Conversation Powered by Masterbot and Nine Agents | 42 |
| 9. Implementation using Computer Program Products, Methods, and Computing Entities | 45 |
| 9.1 Overview of Hardware and Software Implementation | 45 |
| 9.2 Exemplary System Architecture | 47 |
| 9.3 Exemplary Management Computing Entity | 47 |
| 9.4 Exemplary User Computing Entity | 50 |
| 10. Illustrative Machine Learning Modules | 53 |
| 11. Benefits of the Present Invention | 56 |
| 12. Conclusions | 59 |

1. Terminology and Introduction
1.1 Terminology

"LINC" and "LINC GLOBAL" are trademark names carrying embodiments of the present invention, and hence, the aforementioned trademark names may be interchangeably used in the specification and drawings to refer to the products/services offered by embodiments of the present invention. These terms may be used in this specification to describe the overall virtual assistant platform, as well as the company providing said platform.

"Multi-service virtual assistant" or "virtual assistant platform" refers to a software platform that can conduct a conversation with end users using natural language to pro- "Utterance" or "user utterance" are inputs from an end user, for example, speech in an audio system (e.g., AMAZON ALEXA) or textual input in a chat system.

"Parsed user input," "user input," or "natural language input (NLI)" refer to utterances from the user that have been processed via a natural language understanding (NLU) module, described below, to generate machine-parsed data. Sometimes "utterance" is used as short-hand for user utterances that have been processed through the NLU module into parsed user input (without explicitly considering the NLU module). That is, in some contexts, for simplicity, no distinction is made between "user utterance" and "parsed user input."

"Information value" or "information unit" is a piece of information that the information agents may obtain from the parsed user input. The information value may be obtained via understanding the information value from the current utterance, inferring it from the current or previous utterances and/or contextual data, or surveying it from the end user, as described in detail below.

"Information agent," "info agent," or "information block" is a software agent or module that is specialized in obtaining an information value from the user input. For example, an info agent may determine an order number for a given user by inferring the order number from a given order date because there was only one order for the given user on the given order date.

"Action agent" or "action block" is a software agent or module that is specialized in performing an action based on user input. For example, generating a return slip in response to a request from the user to return an item in an order.

"Building block," "block," or "agent" refers to the information agent(s) and/or action agent(s), or both, depending on context.

A "software agent" or "module" is a software subroutine or module that encapsulates a well-defined function or operation and can be independently programmed, debugged, activated, deactivated, and evaluated for performance. A software agent is a logical organizational structure for program code. A software agent comprises program code that can be independently activated multiple times and reused by one or more masterbots across different implementations of the platform, with one masterbot for each implementation of a given virtual assistant platform. Each masterbot implementation can reuse the info and action agents across implementations.

A "masterbot" or "arbiter agent" is the top-level agent that is responsible for selection, activation, and arbitration of the plurality of info agents and action agents.

"Conversation" is a complete dialog between the end user and the virtual assistant (chatbot) conducted in natural language form. A conversation may comprise one or more "services." The boundary to delineate different conversations with the same end user is generally idle time. For example, if the virtual assistant receives the end user's utterance after one hour of idle time, a new conversation has begun.

"Service" refers to a particular topic or area of interest shared between the end user and the virtual assistant as part of the conversation. Examples of services are order status checking, asking for the latest coupon, modifying an order, and checking the store hours. A service can consist of one or more "turns."

Figure 3:
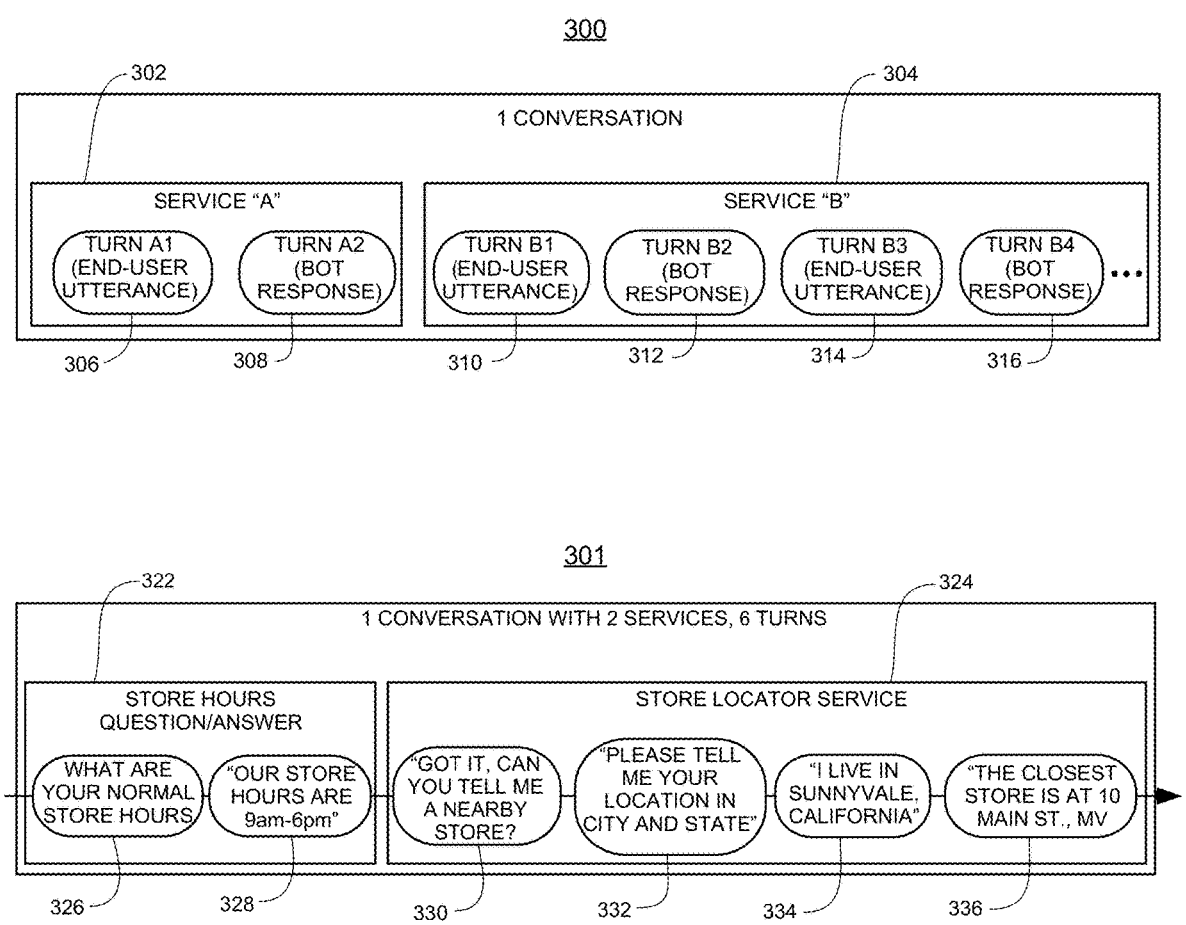
FIG. 3 shows diagrams illustrating a sample conversation comprising two services and multiple conversation turns, in accordance with example embodiments of the disclosure.

"Turn" refers to an exchange of messages between the end user and the virtual assistant. For example, "Where is my order?" (user) and "Your package has been shipped and will arrive on Saturday" (chatbot). There are two turns in this example; one is produced by the user, and one is produced by the chatbot. From the virtual assistant's point of view, the focus is on the chatbot side as it is the main job of the chatbot to respond. The pairing of these two turns is sometimes called "adjacency pairs." For an illustrative example, FIG. 3 shows a diagram illustrating a sample conversation comprising two services and multiple conversation turns.

1.2 Introduction

This disclosure describes the overall LINC architecture, and highlights the three main pillars of the LINC system: two building blocks (information agents and action agents) as logical units to construct a dialog, and a masterbot that can coordinate among the building blocks and orchestrate a flexible, complete conversation from end-to-end that is very difficult to accomplish using prior art architectures and approaches.

While a complete implementation of a virtual assistant platform requires natural language understanding (NLU), gateways to various conversational channels (such as FACEBOOK MESSENGER, AMAZON ALEXA, etc.), and application state management, this disclosure focuses on the aspects of information management, dialog generation, service execution, and overall dialog management that can enable a multi-service oriented conversation scenario. This is something that single-service or narrowly defined virtual assistants (e.g., traditional chatbots) often fail to address.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Embodiments of the present invention may be implemented in various ways, including as computer program products comprising articles of manufacture, such as a non-transitory computer-readable storage medium storing program codes, executable instructions, and/or the like. Various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

With reference to the figures, embodiments of the present invention are now described in detail. It would be understood by persons of ordinary skills in the art that the block diagrams, schematics, and flowchart illustrations as presented herein may be implemented in the form of a computer program product, a hardware product, a combination of computer program and hardware products, and/or apparatus, systems, computing devices, and/or the like to execute instructions, operations, or process steps as presented.

2. Overall System Architecture

FIG. 1 shows a diagram 100 illustrating a system architecture of a virtual assistant platform, in accordance with example embodiments of the disclosure. In one embodiment, the virtual assistant platform comprises the following primary sub-systems: a natural language understanding (NLU) module 106, a masterbot 108, one or more action agents 112, and one or more information agents 120.

The end user 102 generates an utterance 104, such as via speech, video, or textual input. The user utterance 104 is processed through NLU module 106, which generates a parsed user input that is computer-readable and convenient for future consumption. The NLU module 106 is a sub-system that handles natural language understanding (NLU), whose objective is to take the utterance 104 as input, digest and parse it, and output standard language constructs that can be easily consumed by other components. Typically, the NLU module 106 output comprises user intent (as defined by a particular domain), entity extraction (product name, time, date, location, price, email, etc.), and reference resolution. In some embodiments, the NLU module 106 output also comprises sentiment analysis, speech act classes, language identification, and/or emoji recognition.

The masterbot 108 is a controller that is responsible for the orchestration of the entire conversation by exchanging information with various sub-system, triaging and selecting the best action agent 112 or info agent 120 from a pool of candidates, executing the appropriate agent(s), and passing the response back to the end-user 102 (dashed line). The operation of the masterbot 108 is described in greater detail below.

The action agents 112 and info agents 120 denote the two sets of conversation building blocks available in the platform. At runtime, as a multi-service conversation is taking place, some of these agents will become active and participate in the construction and generation of the reply to the user. Each action agent 112 has access to a natural language generation (NLG) module 116, which is used to generate a natural language reply 118, such as a response to an action. Similarly, each info agent 120 has access to a natural language generation (NLG) module 124, which is used to generate a natural language reply 126, such as an information survey to query the user for more information. The operation of the info agents 112 and action agents 120 is described in greater detail below.

The orchestration rules/models 110 is a logical subsystem that is responsible of keeping track of current dialog state information, and internal dialog policy to make selection decisions (which may be rule-based or machine learning based models). The masterbot 108 consults with the orchestration rules 110 to make its selection of info agents and action agents.

The API gateway to external services 114 provides utility for certain services—it is used by the virtual assistant platform to connect to external systems to perform desired action(s). For example, to cancel an order, to perform a product search, or to check the current temperature. The API gateway 114 denotes a common mechanism for these requests to external systems to take place.

The contextual data store 122 is a sub-system that conceptually represents "memory" as well as common "domain knowledge" that are needed to conduct a meaningful conversation. "Memory" comprises past interaction history, such as previous dialog turns, conversations from last week, shopper profiles (order history, stated shopping preference, etc.), and so on. "Domain knowledge" comprises the aggregate information that is specific to the services supported by the platform. For example, for an e-commerce website, the product catalogue is an important information source of "domain knowledge." The contextual data store 122 can be used to assist a) the masterbot 108 to make improved action agent decisions; b) the individual info agents 120 to make inferences; and c) both action agents 112 and info agents 120 to generate appropriate natural language replies.

Figure 2:
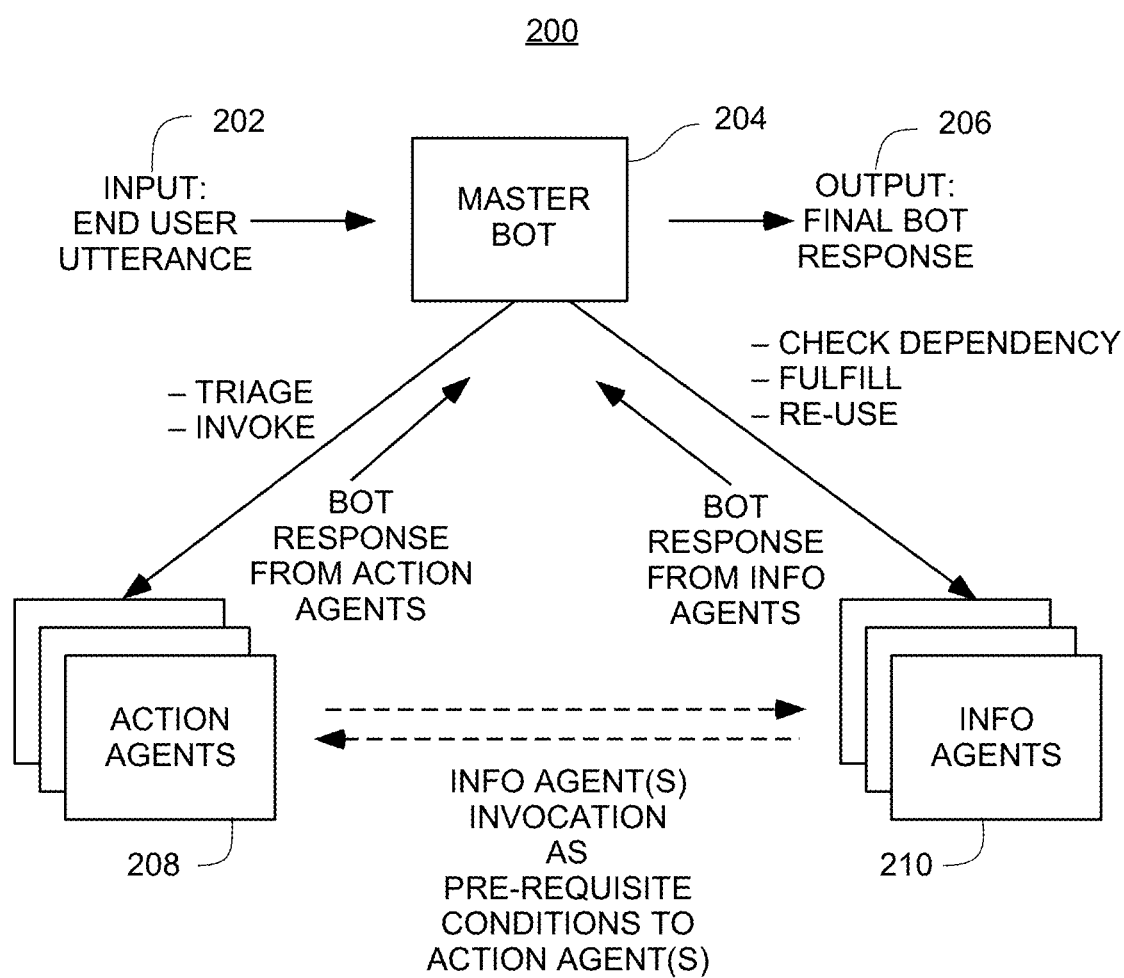
FIG. 2 shows another diagram illustrating an architecture of the virtual assistant platform having a masterbot, and a plurality of information (info) agents and action agents, in accordance with example embodiments of the disclosure.

FIG. 2 shows another diagram 200 illustrating an architecture of the virtual assistant platform having a masterbot 204, and a plurality of action agents 208 and info agents 210, in accordance with example embodiments of the disclosure. The masterbot 204 is used to arbitrate between a plurality of action agents 208 and info agents 210 based on the user input 202 (after processing via the NLU module, which is not shown in FIG. 2). First, the masterbot 204 determines a given action agent 208 to invoke in response to the user input 202. Then, the masterbot 204 checks the given action agent's 208 prerequisite condition(s), if any. In turn, the masterbot 204 invokes any info agent(s) 210 that are prerequisite conditions for the given action agent 208. The info agents 210, in turn, fulfill the requested prerequisite conditions as described below. The action agents 208 and info agents 210 can each generate natural language replies for the masterbot 204 to relay to the end user in the form of responses through a natural language generation (NLG) module, not shown in FIG. 2. Finally, the masterbot 204 outputs the final bot response 206 to the user.

FIG. 3 shows diagrams 300 and 301 illustrating a sample conversation comprising two services and multiple conversation turns, in accordance with example embodiments of the disclosure. Diagram 300 shows a schematic of a conversation construct comprising two services and six turns. Service "A" 302 comprises turn 306 (end-user utterance) followed by turn 308 (bot response). Service "B" 304 comprises turn 310 (end-user utterance) followed by turn 312 (bot response), followed by turn 314 (end-user utterance) followed by turn 316 (bot response).

Diagram 301 shows an actual sample conversation comprising two services and six turns, which was illustrated schematically in diagram 300. Store Hours Service 322 comprises turn 326 (end-user utterance—"What are your normal store hours?") followed by turn 328 (bot response—"Our store hours are 9 am-6 pm"). Meanwhile, Store Locator Service 324 comprises turn 330 (end-user utterance—"Got it, can you tell me a nearby store?") followed by turn 332 (bot response—"Please tell me your location in city and state"), followed by turn 334 (end-user utterance—"I live in Sunnyvale, Calif.") followed by turn 336 (bot response—"The closest store is at 10 Main St., Mountainview, Calif.").

3. Overview of Building Blocks—Information Agents & Action Agents

In one embodiment, there are two types of conversation building blocks residing on the virtual assistant platform—info agents and action agents. All conversations are assembled from these two types of conversation agents, i.e., every individual bot response is generated either by a particular info agent or by a particular action agent. The responsibility of the platform is to host these agents and to enable the creation of these agents with low effort. At runtime, while engaging with the end user to conduct a conversation, the platform manages a pool of currently active/activated agents and selects the right agent to execute for response generation back to the end user. In this fashion, end users can enjoy the benefit of having a flexible, fluid conversation to accomplish their service goals, often many within the same conversation. At the same time, application developers have an environment where they are able to quickly build new services by leveraging many existing agents and the platform's capability to automatically generate part of the dialog flow.

Figure 4:
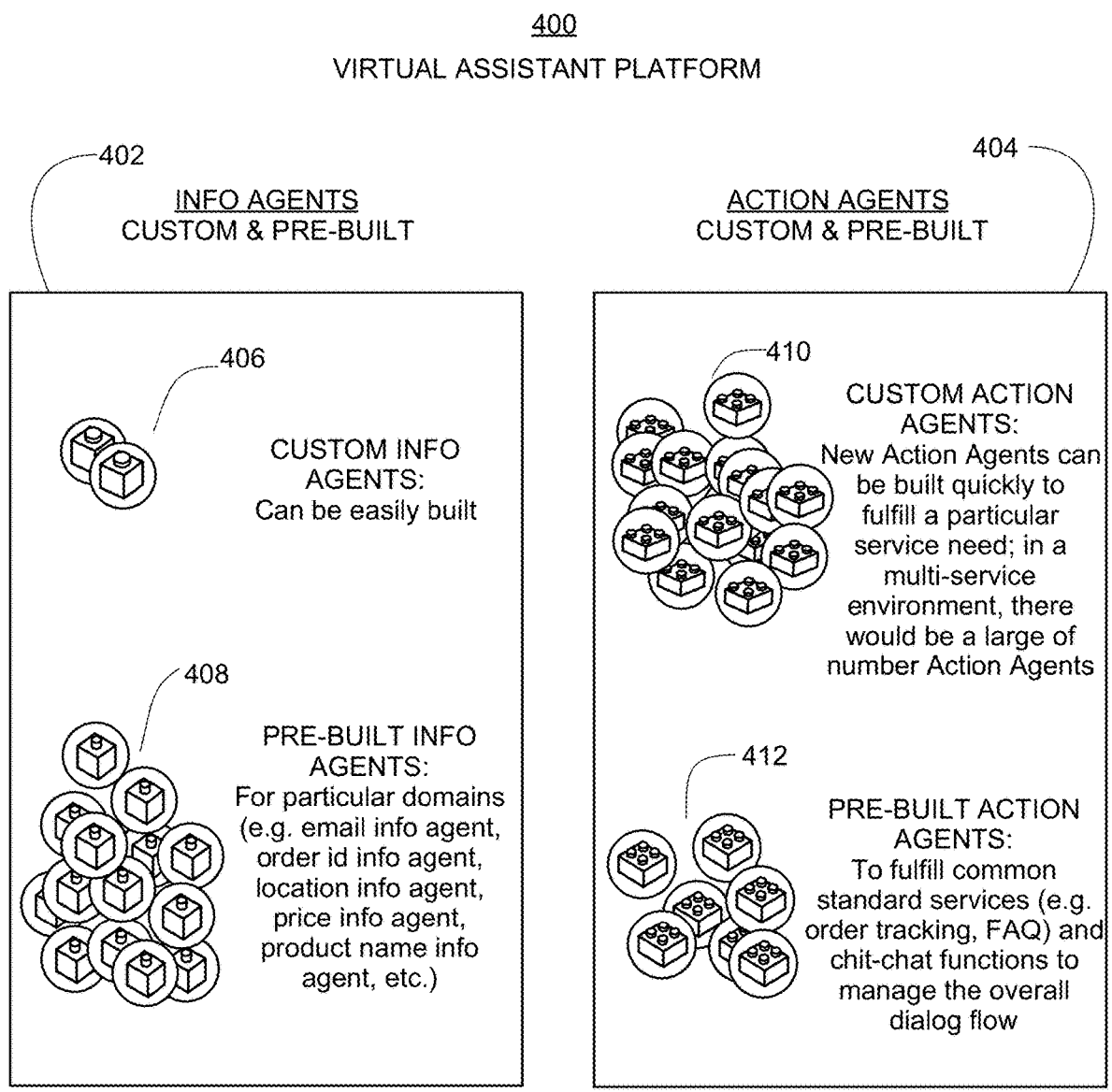
FIG. 4 shows a diagram illustrating an embodiment of a virtual assistant platform comprising info agents (custom and pre-built) and action agents (custom and pre-built), in accordance with example embodiments of the disclosure.

The primary responsibility of info agents is to manage a particular information need during the course of a conversation, while the primary responsibility of action agents is to perform service actions. Both agents can generate natural language responses back to end users. FIG. 4 shows a diagram 400 illustrating an embodiment of the virtual assistant platform comprising info agents 402 and action agents 404, illustrating a typical embodiment of the virtual assistant platform with respect to agent availability and extensibility. A developer can develop custom info agent(s) 406. There are also a large number of pre-built, ready-to-use info agents 408 for a particular domain—e.g. email info agent, order ID info agent, location info agent, price info agent, product name info agent, and so forth. In a typical multi-service environment, there would also be a large number of action agents 404. New custom action agents 410 can be built quickly to fulfill a particular service need. There are also many pre-built action agents 412 to fulfill common standard services (e.g., order tracking, FAQ, etc.) and chit-chat functions to manage the overall dialog flow.

For practical use, a typical embodiment of the platform comes with a rich set of pre-built, reusable info agents 408. Also, many pre-built action agents 412 related to rendering a natural conversation such as chit-chat ("small talk"), such as greeting, gratitude, compliment, and flow control are available in a typical embodiment of the virtual assistant platform. However, it should be noted that both new info agents 406 and new action agents 410 are easy to build following a standard protocol and the platform will understand the relationship between interacting info agents and action agents, how to fulfill the necessary information values, and perform the services and to generate a response to conduct a fluid conversation with the end user.

4. Information Agents
4.1 Role of Information Agents

Figure 5:
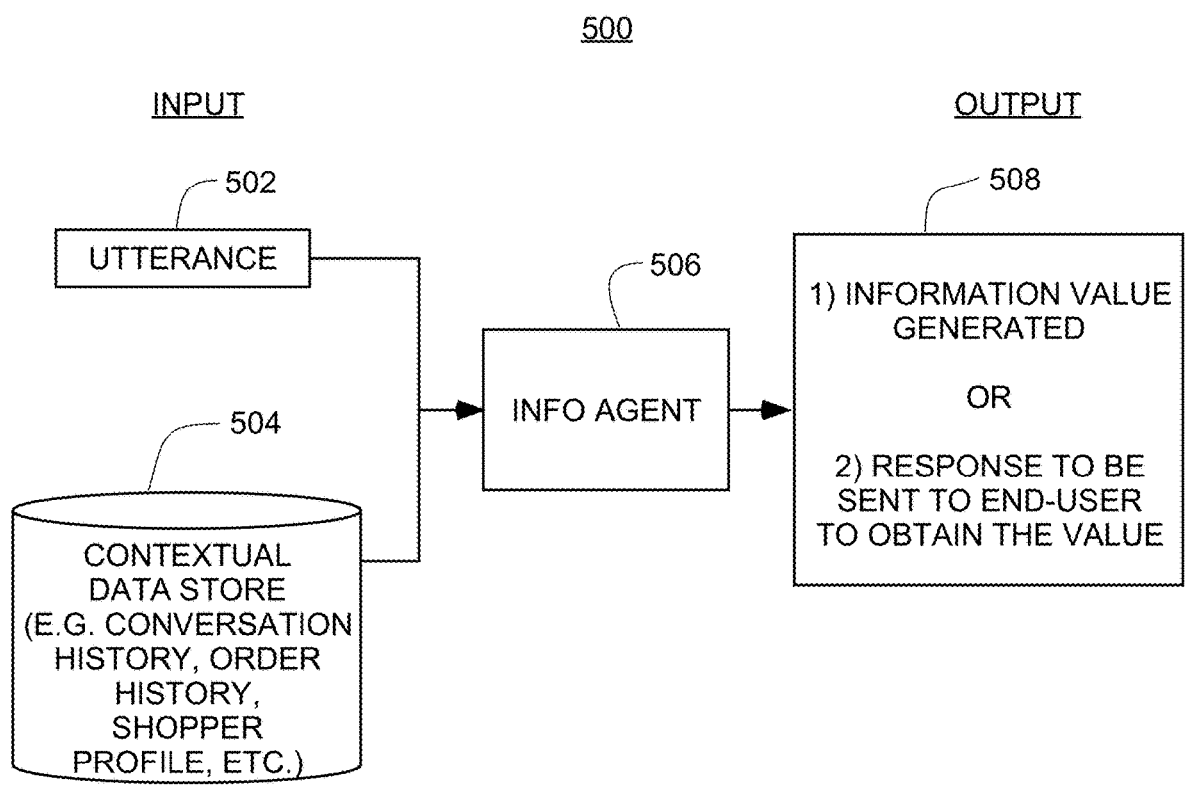
FIG. 5 shows a diagram illustrating an architecture of an info agent, in accordance with example embodiments of the disclosure.

FIG. 5 shows a diagram 500 illustrating an architecture of an info agent and the role that info agents play in the virtual assistant platform, in accordance with example embodiments of the disclosure. At its core, an info agent 506 is a logical and autonomous programming unit to manage a particular information need as the conversation unfolds. An info agent 506, when activated, takes input from various information sources, including a current utterance 502 and a contextual data store 504.

The current utterance 502 is represented in the internal language representation (parsed user input) generated by the NLU module described above (not shown in FIG. 5). For example, the current utterance comprises different entity values extracted, their reference resolutions, a part of speech (POS) tag, parse tree, user intent, and so on.

The contextual data store 504 stores information on "memory," comprising past interaction history, such as previous dialog turns, conversations from last week, shopper profiles (order history, stated shopping preference, etc.), and so on, and "domain knowledge" comprising the aggregate information that is specific to the services supported by the platform, such as the merchant's product catalog.

The target output 508 of the info agent 506 is the information value of interest. For example, for Email Info Agent, the target output 506 would be the information value "tom@gmail.com". Optionally, info agents can also generate additional metadata output such as confidence level, information source(s) used to make the decision, alternative value choices, etc. This metadata could be helpful for other components, such as action agents, and other info agents to make better downstream decisions.

Three techniques used by info agents to determine a final information value are "understand," "infer," and "survey." While it is not a hard requirement, a typical info agent implementation will come with all these capabilities: to understand, to infer, and to survey. The objective is to fulfill the information value as accurately and quickly as possible—mostly by the info agent itself, and occasionally with a little bit of help from the end user or other info agents.

4.2 Capability of Information Agents

Figure 6:
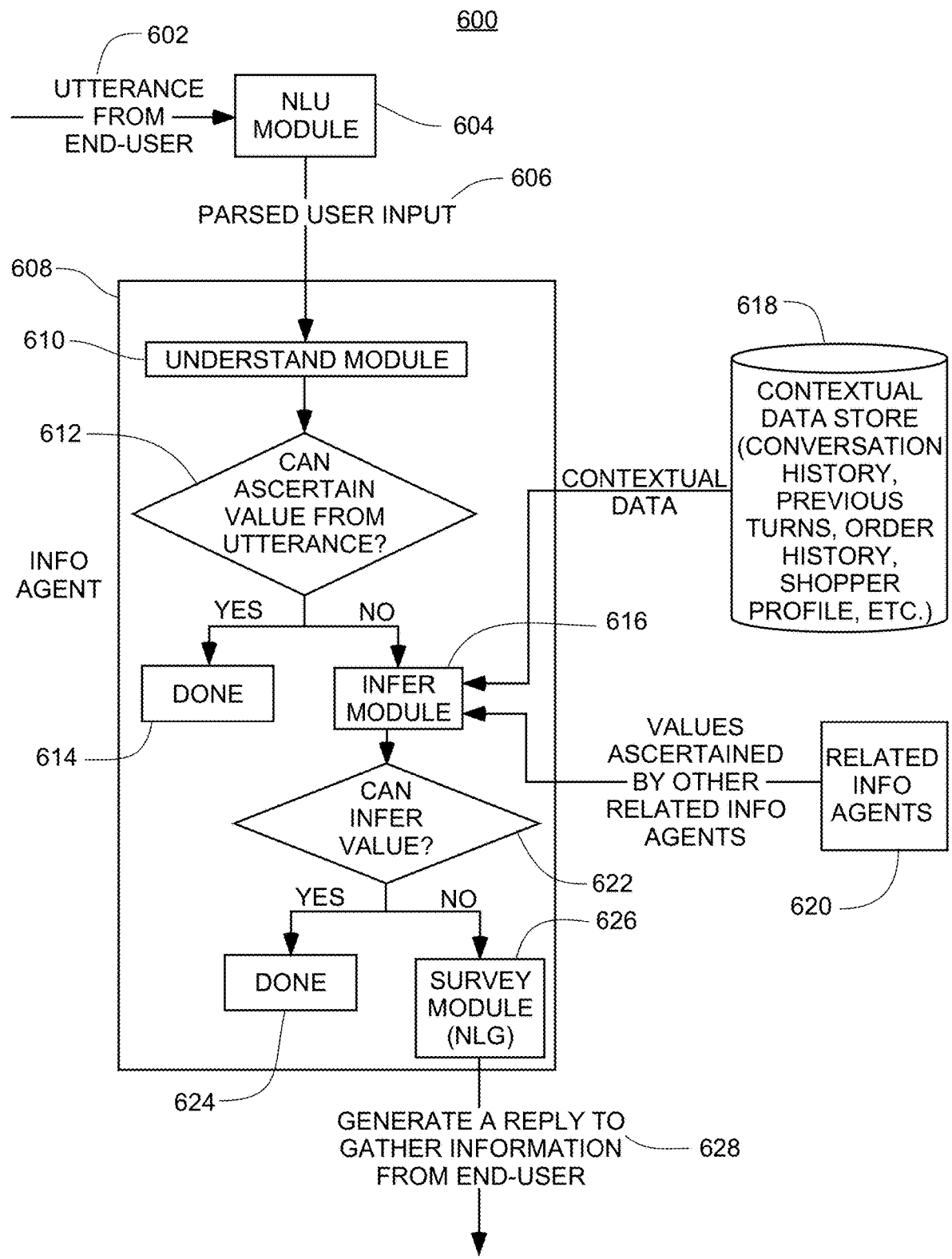
FIG. 6 shows a diagram illustrating a process flow of an info agent, in accordance with example embodiments of the disclosure.

FIG. 6 shows a diagram 600 illustrating a process flow of an info agent 608, in accordance with example embodiments of the disclosure. To fulfill a given information value at run time, an info agent 608 goes through an internal process to invoke three capabilities, as needed: understand, infer, and survey using an understand module 610, an infer module 616, and a survey module 626, respectively.

As discussed, a typical embodiment of the invention would generally comprise a centralized NLU module 604 within the virtual assistant platform to digest end user's utterance 602, parse it, and output a machine-readable interpretation, or parsed user input 606, to the info agent 608 to make a decision. It is not efficient to duplicate NLU module 604 functionality at the level of individual info agents 608.

The understand module 610 comprises the ability to understand end user utterances in natural language form 606 and identify and extract the right information to fulfill the information value. That is, if the understand module 610 can ascertain the information value from the utterance in decision step 612, then the info agent 608 is done and can output the information value of interest at step 614. For example, for "Email Info Agent", the agent will understand the following utterance: "Hi my email address is tom@gmail.com" and automatically fulfill the information value to be "tom@gmail.com".

The infer module 616 comprises the ability to combine the current parsed user input 606 with previously known contextual data from the contextual data store 618 or from other info agents 620 to compute the information value. This could be based on conversation history between the end user and the virtual assistant platform or some user profile data. That is, if the infer module 618 can infer the information value in decision step 622, then the info agent 608 is done and can output the information value of interest at step 624. For example, Tom asks the virtual assistant, "Can I check my membership status?" If the virtual assistant had already talked to Tom just 30 minutes ago (via some identification mechanism, such as browser cookie or FACEBOOK MESSENGER User ID), and remembers the previous value being tom@gmail.com, the Email Info Agent can automatically infer the information value. Note that since inference doesn't guarantee the value, the info agent can choose to assign a confidence score (or probability score) to indicate how strongly the agent believes the information value.

The survey module 626 comprises the ability to conduct a dialog question 628 to acquire the information value directly from the end user. This usually is the last resort after the understand and infer modules 610 and 616 cannot ascertain the information value. For example, Email Info Agent can engage with the end user with the following simple dialog sequence: "What is the email you like to use?", and the end user responds with "My email is tom@gmail.com". After this exchange, Email Info Agent will determine that the information value is "tom@gmail.com".

In summary, the info agent 608 possesses the capability of contextual data retrieval, and computation and automatic sub-dialog generation to engage with end users. It is NLU-enabled, contextual, and conversational. The end-result is the availability of the information value of interest.

4.3 Building New Info Agents

The more info agent(s) available in a virtual assistant platform, the more new services the platform can quickly assemble to expand the usefulness of the conversation bot. The implementation of an info agent depends on the actual embodiment of the overall virtual assistant platform. One example would be to support adding new info agents in a declarative language to minimize the coding effort. For example, an info agent can specify using JSON or XML, what entity extraction type and value it should focus on, and how to map that information to the final value. The XML can also specify how to combine different information sources to make an inference, what other related info agent(s) it can leverage, and how to deduce the information value from those related info agents, and finally, how to compose the survey question to ask the end user for obtaining additional information.

4.4 Examples of Information Agents

To continue with the Email Info Agent example, the following is a detailed description of the internal implementation during runtime in all three cases—understand, infer, and survey.

4.4.1 Illustrative Understand Info Agent

Figure 7:
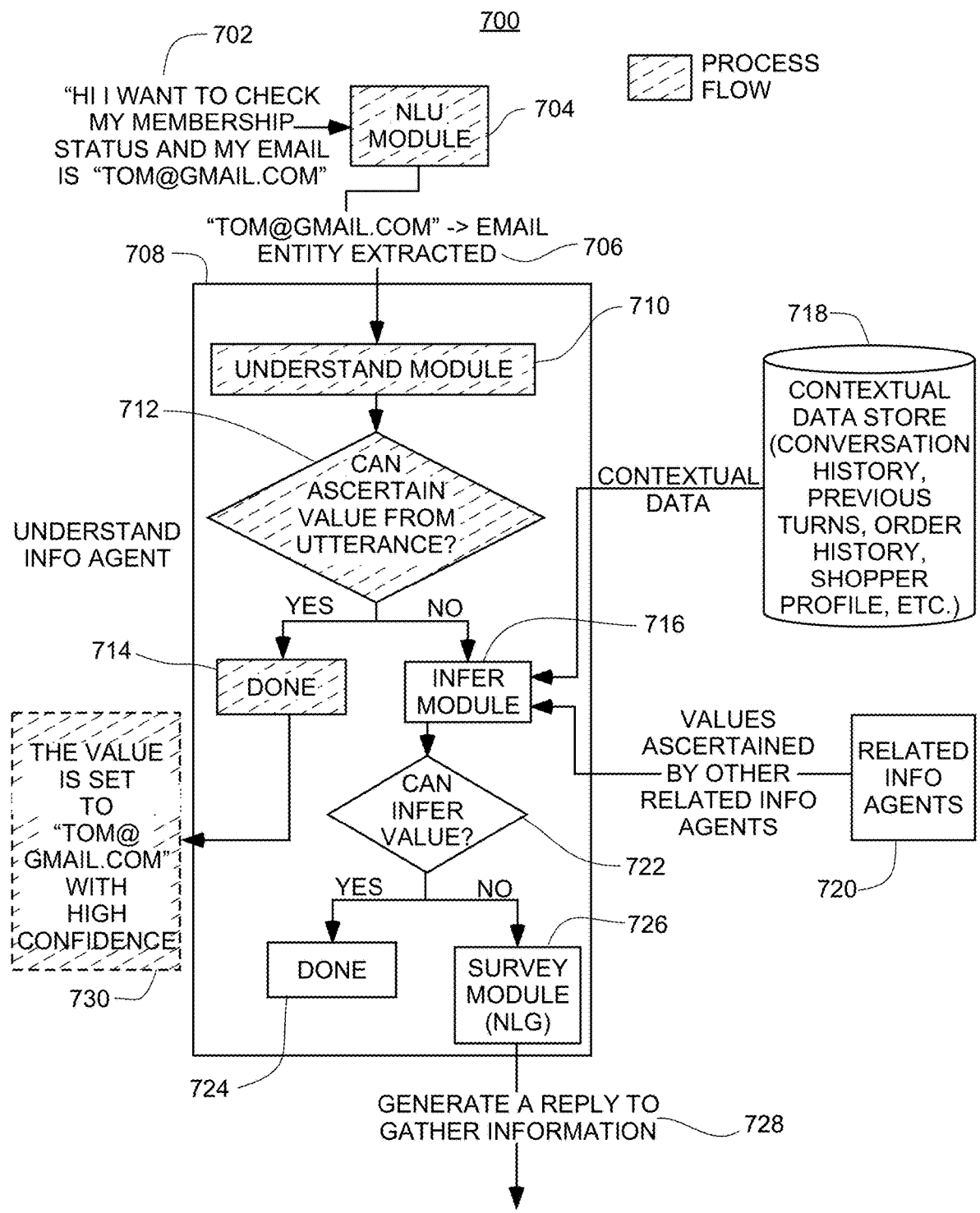
FIG. 7 shows a diagram illustrating a sample flow through an info agent for understanding user utterances, in accordance with example embodiments of the disclosure.

FIG. 7 shows a diagram 700 illustrating a sample flow through an info agent 708 for understanding user utterances, in accordance with example embodiments of the disclosure. To fulfill a given information value at run time, an info agent 708 goes through an internal process to invoke the understand capability, as needed, to understand the information value directly from the current utterance.

The NLU module 704 digests the end user's utterance 702, parses it, and outputs a machine-readable interpretation 706 to the info agent 708. The understand module 710 understands the end user utterances in natural language form 706 and identifies and extracts the right information to fulfill the information value. That is, if the understand module 710 ascertains the information value from the utterance in decision step 712, then the info agent 708 is done and can output the information value of interest at step 714, as output information value 730. For example, for "Email Info Agent", the agent will understand the following utterance: "Hi I want to check my membership status and my email address is tom@gmail.com" and automatically fulfill the information value 730 to be "tom@gmail.com".

Alternatively, if the info agent cannot understand the information value from the current user input 706, the infer module 716 can combine the current input 706 with previously known contextual data from the contextual data store 718 or from other info agents 720 to compute the information value. That is, if the infer module 716 can infer the information value in decision step 722, then the info agent 708 is done and can output the information value of interest at step 724. Finally, the survey module 726 can conduct a dialog question 728 to acquire the information value directly from the end user if the info agent cannot understand nor infer the information value.

4.4.2 Illustrative Infer Info Agent

Figure 8:
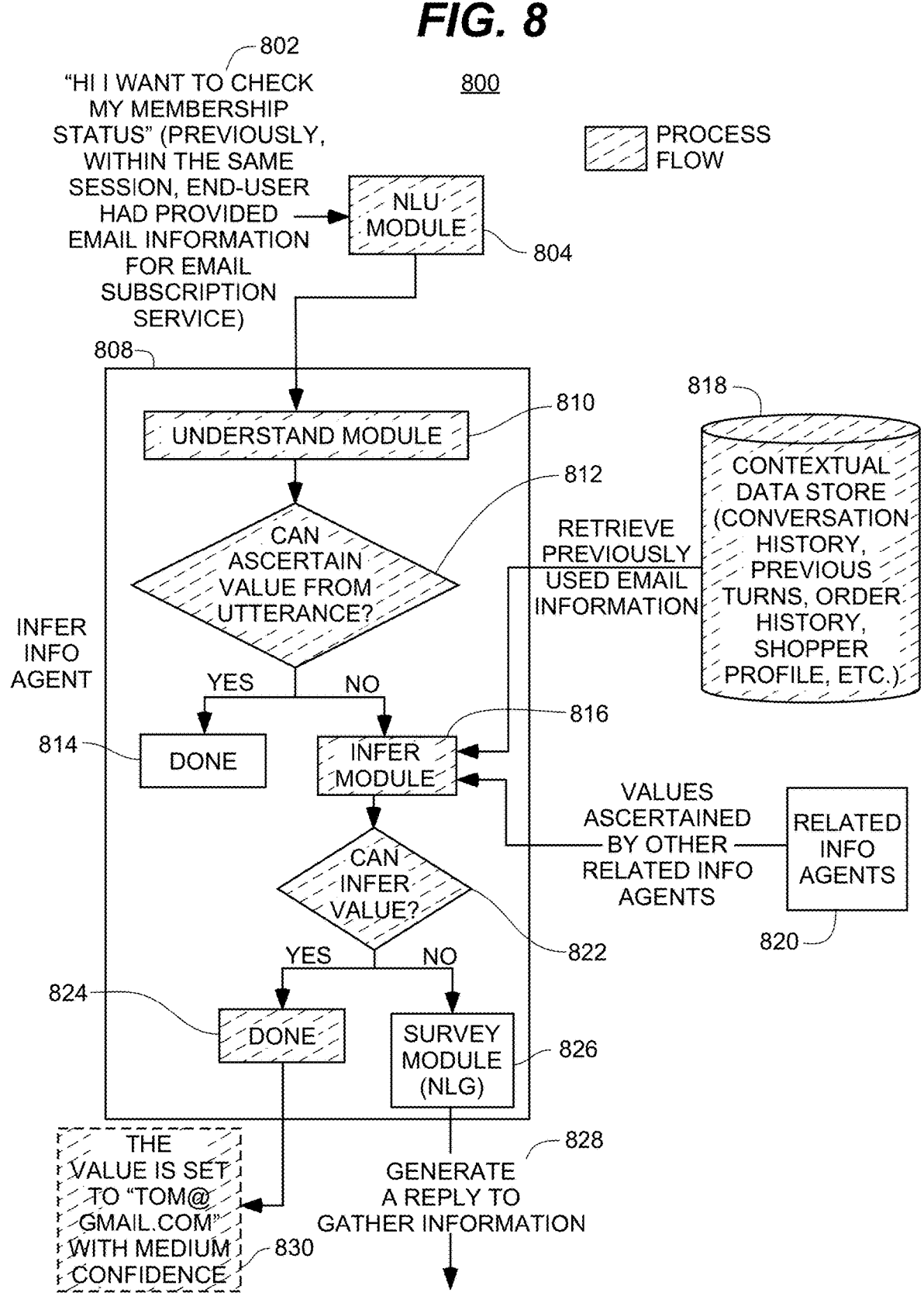
FIG. 8 shows a diagram illustrating a sample flow through an info agent for inferring information from user utterances and contextual data, in accordance with example embodiments of the disclosure.

FIG. 8 shows a diagram 800 illustrating a sample flow through an info agent 808 for inferring information from user utterances and contextual data, in accordance with example embodiments of the disclosure. To fulfill a given information value at run time, an info agent 808 goes through an internal process to invoke the infer capability, as needed.

The NLU module 804 digests the end user's utterance 802, parses it, and outputs a machine-readable interpretation to the info agent 808. In this example, the understand module 810 cannot understand the end user utterance directly to identify or extract the right information to fulfill the information value directly. That is, the understand module 810 cannot ascertain the information value from the current utterance in decision step 812 and cannot output the information value of interest at step 814. For example, the user has not supplied the information value of interest in the current utterance.

Instead, since the info agent cannot understand the information value from the current utterance, the infer module 816 combines the current input with previously known contextual data from the contextual data store 818 or from other info agents 820 to compute the information value. This could be based on conversation history between the end user and the virtual assistant platform or some user profile data. That is, if the infer module 816 can infer the information value in decision step 822, then the info agent 808 is done at step 824 and can output the information value 830 of interest. For example, Tom asks the virtual assistant, "Can I check my membership status?" If the virtual assistant had already talked to Tom just 30 minutes ago (via some identification mechanism, such as browser cookie or FACEBOOK MESSENGER User ID), and remembers the previous value being tom@gmail.com, the Email Info Agent can automatically infer the information value. Note that since inference doesn't guarantee the value, the info agent can choose to assign a confidence score (or probability score) to indicate how strongly the agent believes the information value.

Alternatively, the survey module 826 can conduct a dialog question 828 to acquire the information value directly from the end user if the info agent neither understand nor infer the information value.

4.4.3 Illustrative Survey Info Agent

Figure 9:
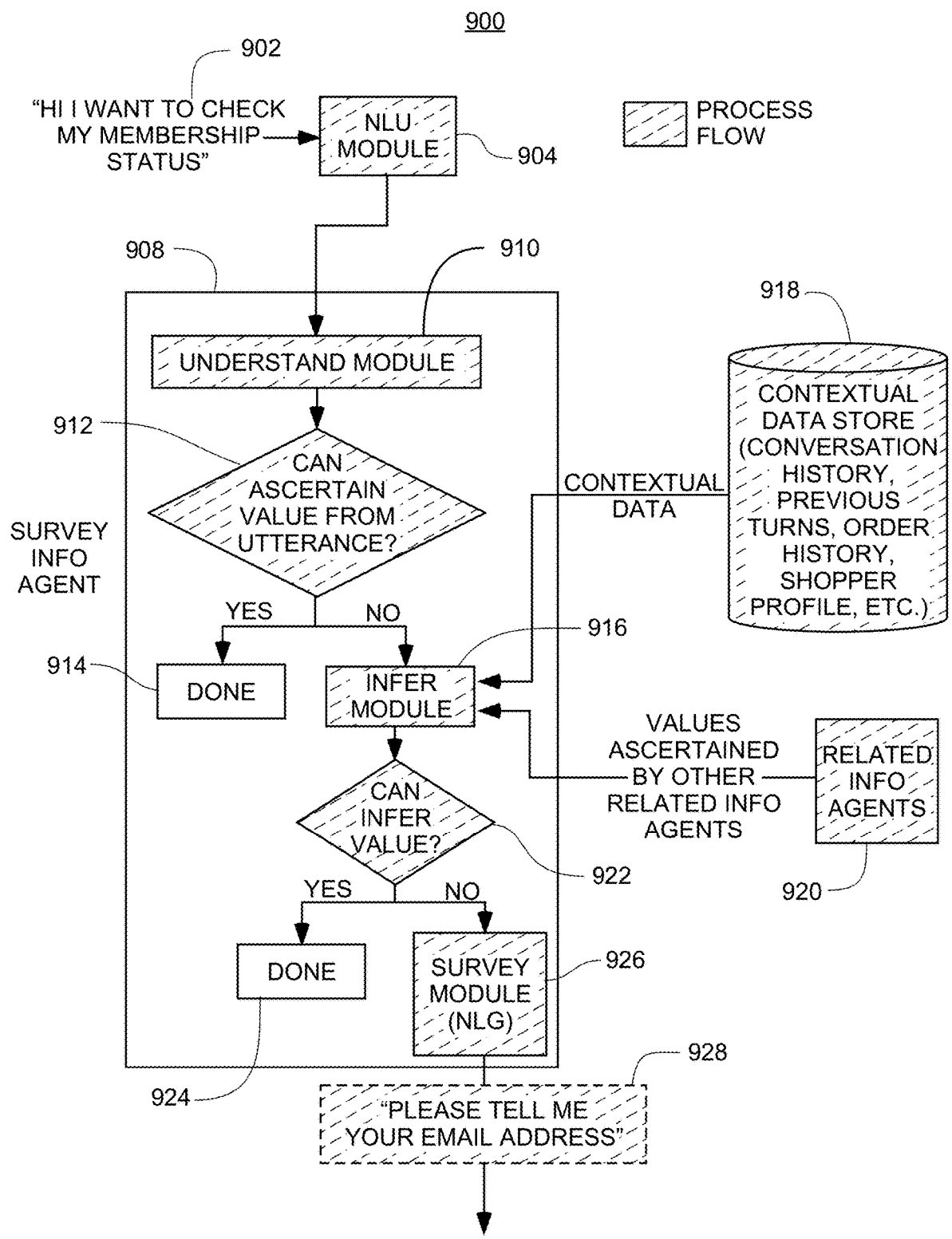
FIG. 9 shows a diagram illustrating a sample flow through an info agent for surveying a user for information that cannot be obtained in any other manner, in accordance with example embodiments of the disclosure.

FIG. 9 shows a diagram 900 illustrating a sample flow through an info agent 908 for surveying a user for information that cannot be obtained in any other manner, in accordance with example embodiments of the disclosure. To fulfill a given information value at run time, an info agent 908 goes through an internal process to invoke the survey capability, as needed.

The NLU module 904 digests the end user's utterance 902, parses it, and outputs a machine-readable interpretation to the info agent 908. In this example, the understand module 910 cannot understand the end user utterances directly to identify or extract the right information to fulfill the information value directly. That is, the understand module 910 cannot ascertain the information value from the utterance in decision step 912 and cannot output the information value of interest at step 914. For example, the user has not supplied the information value of interest in the current utterance.

Similarly, the infer module 916 cannot combine the current input with previously known contextual data from the contextual data store 918 nor from other info agents 920 and cannot compute the information value of interest. That is, in this scenario, the infer module 916 cannot infer the information value in decision step 922 and cannot output the information value of interest at step 924. For example, information value cannot be inferred with reasonable confidence from prior user conversation history, contextual data, or other sources.

Instead, if the info agent cannot understand the information value from the current input, nor infer the information value from other sources, the survey module 926 conducts a dialog question 928 via a natural language generation (NLG) module to acquire the information value directly from the end user. This usually is the last resort after the understand and infer modules 910 and 916 cannot ascertain the information value. For example, Email Info Agent can engage with the end user with the following simple dialog sequence: "Please tell me your email address", and the end user responds with "My email is tom@gmail.com". After this exchange, Email Info Agent, now operating in the understand mode in the subsequent conversation turn, will determine that the information value is "tom@gmail.com" with high confidence.

4.4.4 Three Types of Information Agents Summarized

Table 1 summarizes the three cases of info agents operating in understand, infer, and survey modes to highlight the dialog sequence differences.

TABLE 1

Three Types of Information Agents

| Dialog Sequence | Modules Involved | Comment |
| --- | --- | --- |
| (user): "Hi I want to check my email status and my email is tom@gmail.com" | Understand | Email Info Agent understands and obtains the value directly from the current utterance. |
| (user): "Hi I want to check my email status" | Infer | Email Info Agent can use a variety of information sources to make the best educated inference; for example, because end user already shared the email address for another service, Email Info Agent will infer the value. |
| (user): "Hi I want to check my email status" (bot): "Please tell me your email address" (user): "Certainly, my preferred email address to use is tom@gmail.com" | Survey for the first turn, and then Understand for the second turn | Email Info Agent fails to understand from the current utterance nor can make any inference with high enough confidence, it engages with the end user to prompt for the information value. After the end user provides the value, Email Info Agent will set the information value at the next conversation turn. |

4.5 Inference Among Info Agents

Like real-world knowledge, different info agents could be related to each other and can be used to help each other out. This is particularly true when the virtual assistant platform has access to a host of contextual information, and chances are that some of them are other related info agents themselves. At runtime, as an info agent implementation is called upon to provide information, it can leverage these related info agents directly, just as it can leverage generic contextual data. Furthermore, info agents can self-report the underlying info agent's connection(s) that it wishes to collaborate to the masterbot. This process is described in greater detail in the section entitled "Optimal Info Agent Invocation via Inference Based Selection Process."

Below are a few inference examples between different info agents:

Order Number Info Agent is related to Order Purchase Date Info Agent

Order Number Info Agent is related to Order Product Item Info Agent

Email Info Agent is related to Membership ID Info Agent

In FIGS. 6-9, this relationship between info agents is depicted graphically as related info agents 620, 720, 820, and 920, respectively. For example, in FIG. 8, the related info agents 820 can provide the information value ascertained by the other related info agents 820 to the infer module 816 for use by the info agent 808 to infer the information value with the help of the related agents 820. In this manner, in some embodiments, the related information agents 820 might be indirectly invoked for execution at run-time.

5. Action Agents
5.1 Role of Action Agents

Figure 10:
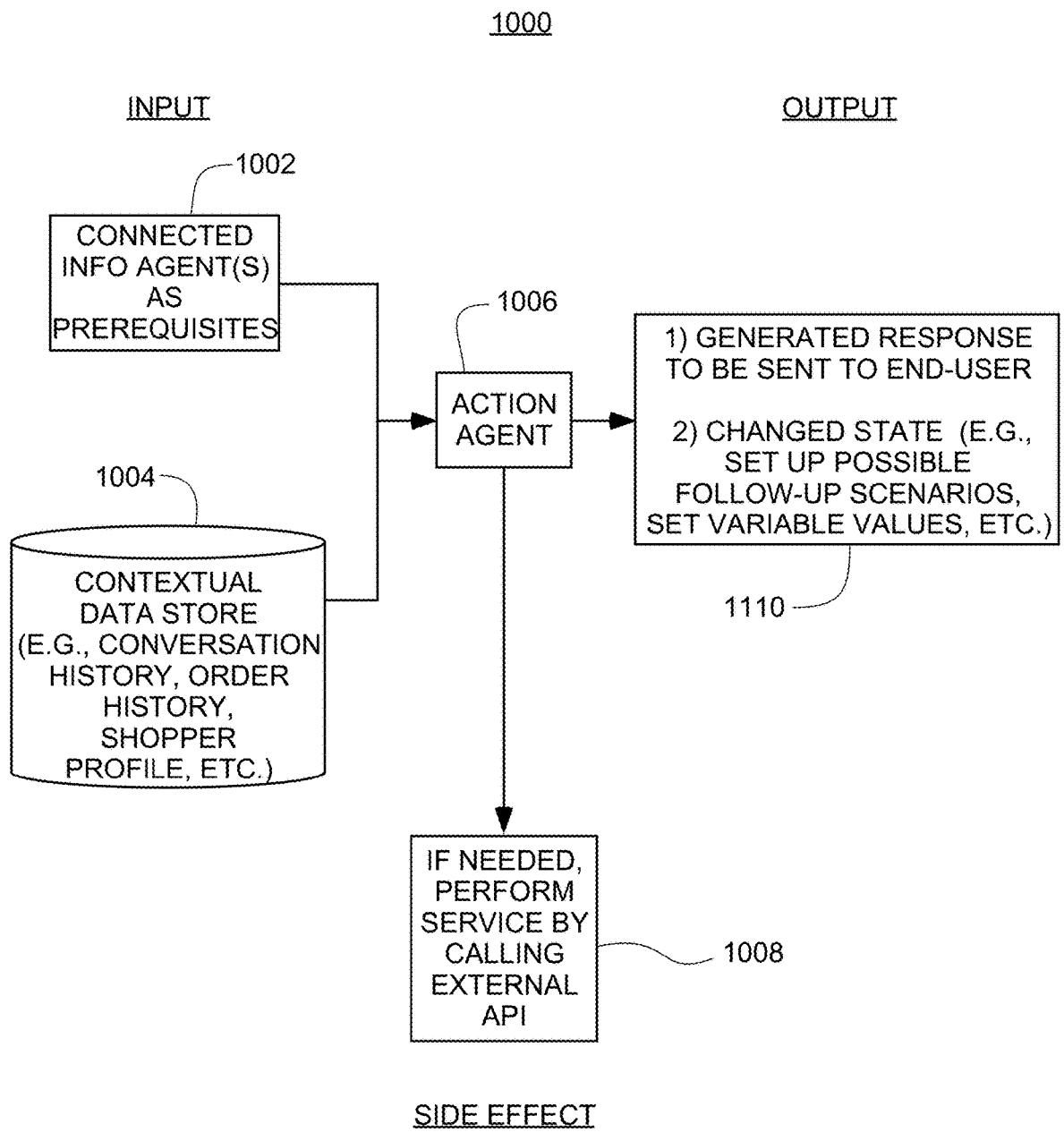
FIG. 10 shows a diagram illustrating an architecture of an action agent, in accordance with example embodiments of the disclosure.

FIG. 10 shows a diagram 1000 illustrating an architecture of an action agent and the role that action agents play within the virtual assistant platform, in accordance with example embodiments of the disclosure. The role of action agent 1006 is to perform an action, generate response(s) to end users, and if needed, signal to the overall virtual assistant platform of a state change. Each action agent 1006 is a unit of "mini-action," meaning, a single action focus that is not too complicated to span across conversational turn boundaries after a given action is taken.

An action agent 1006, when activated, takes input from various information sources, including connected info agent(s) 1002, and contextual data store 1004. The connected info agent(s) 1002 serve as prerequisite conditions for the action agent 1006. The contextual data store 1004 stores information on "memory," comprising past interaction history, such as previous dialog turns, conversations from last week, shopper profiles (order history, stated shopping preference, etc.), and so on, and "domain knowledge" comprising the aggregate information that is specific to the services supported by the platform, such as the merchant's product catalog.

To perform an actual action, the action agent 1006 may need to invoke external or internal API end-points 1008. Finally, the action agent 1006 will generate response(s) to the end user based on the conditions triggered and/or inform the masterbot about any state changes 1110 (invocation state changes and/or application state changes).

5.2 How to Configure an Action Agent

One purpose of an action agent is to perform a certain action, such as checking membership status and rendering a response. For example, "Hi Tom, your membership status is active but would expire in 3 months." Both action and response are specific to individual action agents and require implementation. An example of action agent implementation would include using an API to perform a database query for membership status and using a template system to generate the response based on the result returned from the API.

Before discussing how an illustrative action agent works during runtime, the following data structures would usually need to be been configured (or implemented). In a typical embodiment, the action agent needs the following set-up:

Standalone Triggering Condition(s)

Each action agent needs to declare to the virtual assistant platform on which condition(s) the action agent can be activated, or eligible to be activated (triggered). This can be expressed in the form of a predetermined user intent. For example, "Product Finding Action Agent" can declare that all user intent related to a product search is a good triggering condition. The actual user intent classification can be achieved using annotated training data or domain specific topic ontology, as discussed below.

Standalone Triggering Conditions can be optional. The masterbot's dialog policy management can also specify how the masterbot prefers to activate certain action agents. For example, for an "Apology Action Agent," the masterbot can choose to use a negative sentiment score to determine that an Apology Action Agent should be activated. Another case is that certain action agents could be configured to have no top-level standalone triggering conditions, and these action agents are created to serve as "helper" action agents in follow-up situations, as follow-up agents, as discussed below.

Action Invocation Parameters

The specification on the actual "action" aspect. For example, an API end-point, exact parameters that need to be passed to the API, and so on.

A Set of Info Agent(s) as Prerequisite(s)

These info agents are the required information needed before an invocation of action can take place. More on the relationship between info agent and action agents is discussed later.

A Set of Response(s)

The set of response(s) is the reply generated to the end user.

Optionally, with associated Follow-up Action Agent(s) and Triggering Condition(s).

The implementation of an action agent is essentially to configure all of the necessary data structures mentioned above. One possible implementation choice is to use a domain-oriented declarative language to specify concept ontology association for top-level triggering conditions, dependent info agents, API end-point URLs, expressions to be evaluated to retrieve the parameters needed, and a flexible template system to access on-platform data to render a final reply back to the end user as well as any follow-up triggering condition to link to other action agents.

5.3 How Action Agents Work at Runtime

Figure 11:
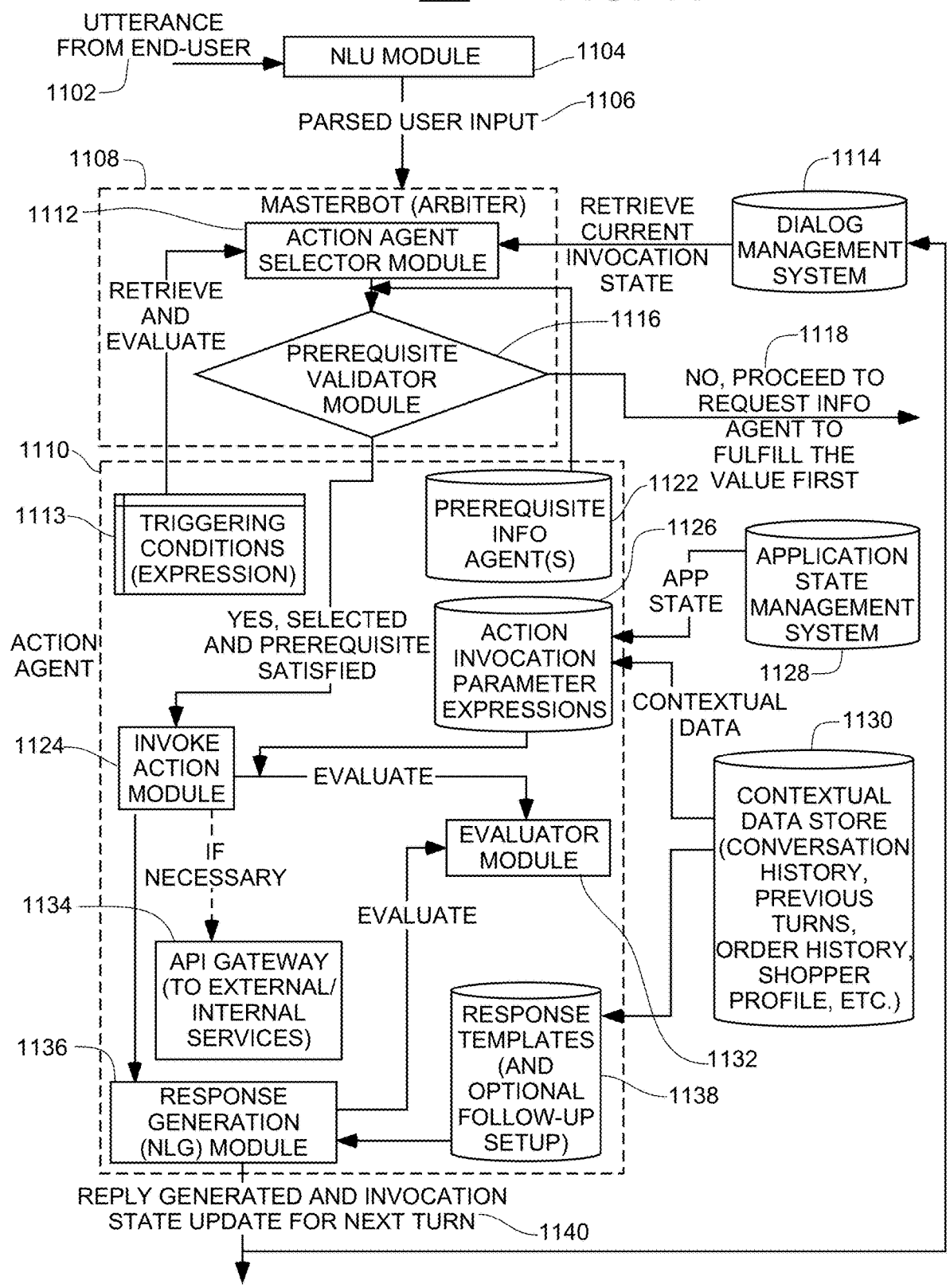
FIG. 11 shows a diagram illustrating components and invocation flow of an action agent, in accordance with example embodiments of the disclosure.

FIG. 11 shows a diagram 1100 illustrating components and invocation flow of an illustrative action agent, in accordance with example embodiments of the disclosure. As discussed, first the end user utterance 1102 is pre-processed via the NLU module 1104 to generate a parsed user input 1106. The parsed user input 1106 comprises extracted language constructs data, intent classification, entity extraction, speech act analysis, sentiment analysis, and so forth, all in machine-readable form convenient for consumption by the rest of the system. The masterbot 1108 is responsible for selecting a particular action agent 1110 to generate a response for the next turn in response to the user input 1106 via the action agent selector module 1112 based on one or more triggering conditions (expressions) 1113 and the current invocation state from the dialog management system 1114 and/or the application state from the application state management system (not shown).

The first step is to query the action agent's 1110 prerequisite condition(s) to see if all the prerequisite info agent(s) 1122 have successfully obtained their information values via prerequisite validator module 1116. If not, the masterbot 1108 will suspend the current action agent 1110 (but remember it as part of the invocation state, dialog management data, etc. via the dialog management system 1114), and instead ask the prerequisite info agent(s) 1122 to ascertain the required information value(s), as shown in step 1118.

If all prerequisite conditions have been met, an action invocation module 1124 will be executed to perform the work of the action agent 1110. In a typical implementation, since the action invocation parameters 1126 can be expressed in a declarative language with variable references and arithmetic expressions, an evaluator module 1132 can be called upon first to evaluate the expression for the final parameter values. If necessary, an API Gateway 1134 can be used to provide a central gatekeeper for outbound/inbound web API traffic for better security and throughput control.

Similar to action invocation parameters, response generation can be facilitated with a template system 1138 and the evaluator module 1132. The contextual data store 1130 provides easy data access to fulfill variable values used in a given template. Using a simple response template example, such as "hi $ {First_Name}, your membership status is $ {API_return_message}", the evaluator module 1132 can check with the contextual data store 1130 and the API invocation's result data, and render a reply 1140 to be "Hi Tom, your membership status is expired" via a natural language generation (NLG) module 1136.

Finally, the end user reply 1140 is passed to the dialog management system 1114, which in turn provides the current invocation state to the masterbot 1108, as needed.

Figure 12:
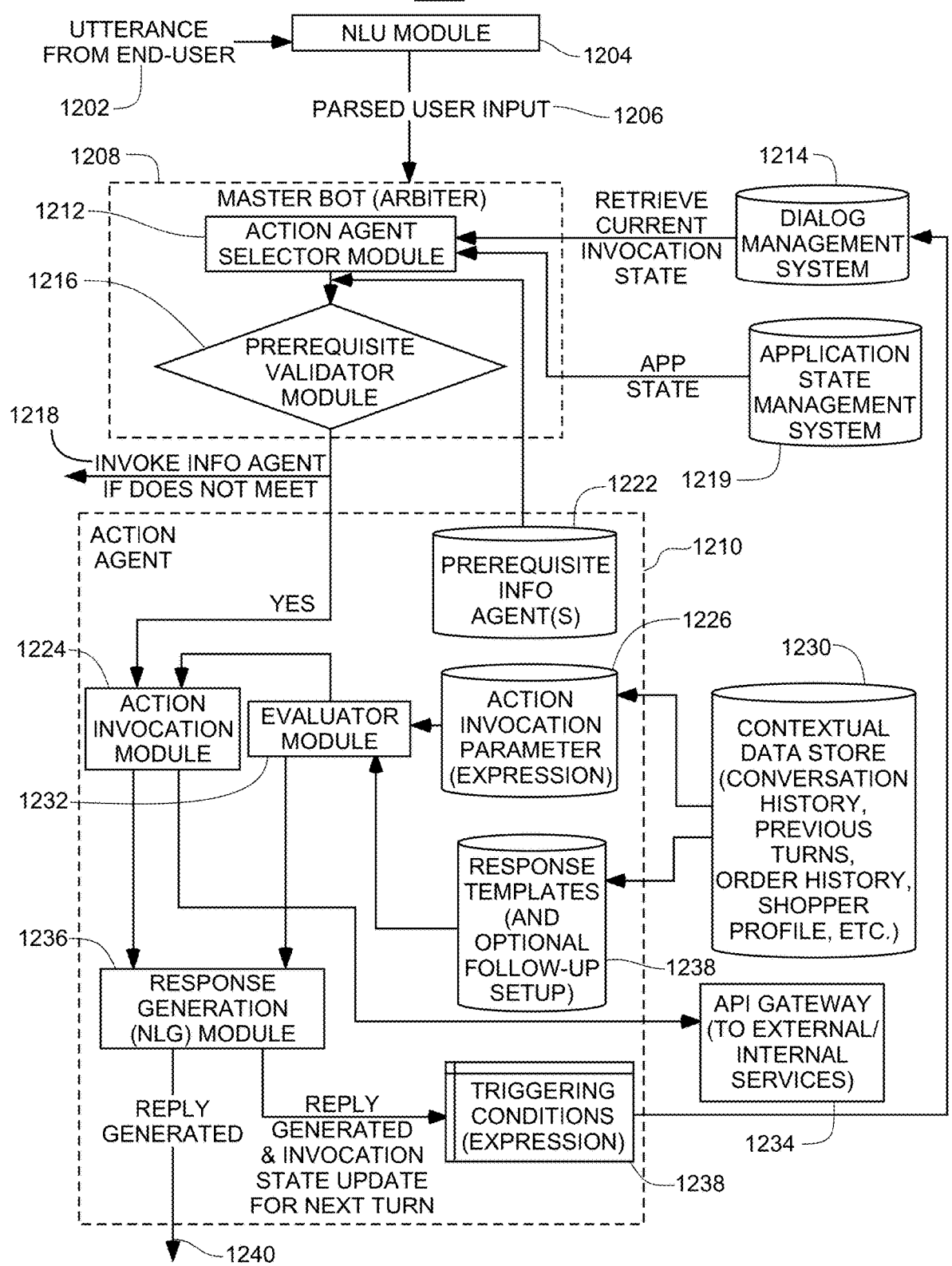
FIG. 12 shows a diagram illustrating components and invocation flow of an action agent at run-time, in particular illustrating how one action agent connects with another action agent via a follow-up relationship, in accordance with example embodiments of the disclosure.

FIG. 12 illustrates a diagram 1200 which shows how action agent execution is conducted after the action agent 1210 has been activated via action agent selector module 1212 (see action agent selector module 1112 in FIG. 11 for more details about this type of triggering condition). Most importantly, FIG. 12 shows how one action agent 1210 connects with another action agent (not shown) via a follow-up relationship as indicated by the triggering conditions (expression) 1238 for a follow-up action agent. A key difference between FIG. 11 and FIG. 12 is the triggering condition role, which in FIG. 11 is focused on illustrating how an action agent 1110, with the help of the masterbot 1108, is activated via a triggering conditions 1113 match. In contrast, FIG. 12 illustrates how an action agent 1210 can create a follow-up connection with another action agent via an anticipatory trigger condition 1238.

Diagram 1200 illustrates components and invocation flow of an action agent at run-time, in accordance with example embodiments of the disclosure. As discussed, first the end user utterance 1202 is pre-processed via the NLU module 1204 to generate parsed user input 1206. As discussed, the masterbot 1208 is responsible for selecting a particular action agent 1210 to generate a response for the next turn in response to the user input 1206 via the action agent selector module 1212 based on one or more triggering conditions (not shown) and the current invocation state from the dialog management system 1214 and/or the application state from the application state management system 1219.

The first step is to query the action agent's 1210 prerequisite conditions to see if all the prerequisite info agent(s) 1222 have successfully obtained their information values via prerequisite validator module 1216. If not, the masterbot 1208 will suspend the current action agent 1210, and instead ask the prerequisite info agent(s) 1222 to ascertain the required information value(s), as shown in step 1218.

If all prerequisite conditions have been met, an action invocation module 1224 will be executed to perform the work. In a typical implementation, since the action invocation parameters 1226 can be expressed in a declarative language with variable references and arithmetic expressions, an evaluator module 1232 can be called upon first to evaluate the expression for the final parameter values. If necessary, an API Gateway 1234 can be used to provide a central gatekeeper for outbound/inbound web API traffic for better security and throughput control.

Similar to action invocation parameters, response generation can be facilitated with a template system 1238 and the evaluator module 1232. The contextual data store 1230 provides easy data access to fulfill variable values used in a given template. Using a simple response template example, such as "hi $ {First_Name}, your membership status is $ {API_return_message}", the evaluator module 1232 can check with the context data store 1230 and the API invocation's result data, and render a reply 1240 to be "Hi Tom, your membership status is expired" via a natural language generation (NLG) response module 1236.

Finally, the reply generated 1240 and the invocation state update for the next turn 1238 are passed as triggering conditions (expression) 1238 to the dialog management system 1214, which in turn provides the current innovation state to the masterbot 1208, as needed. The result is that the action agent 1210 has set up a follow-up connection with a follow-up action agent (not shown) via a follow-up relationship via triggering conditions (expression) 1238.

5.4 Follow-up Action Agents

Figure 13:
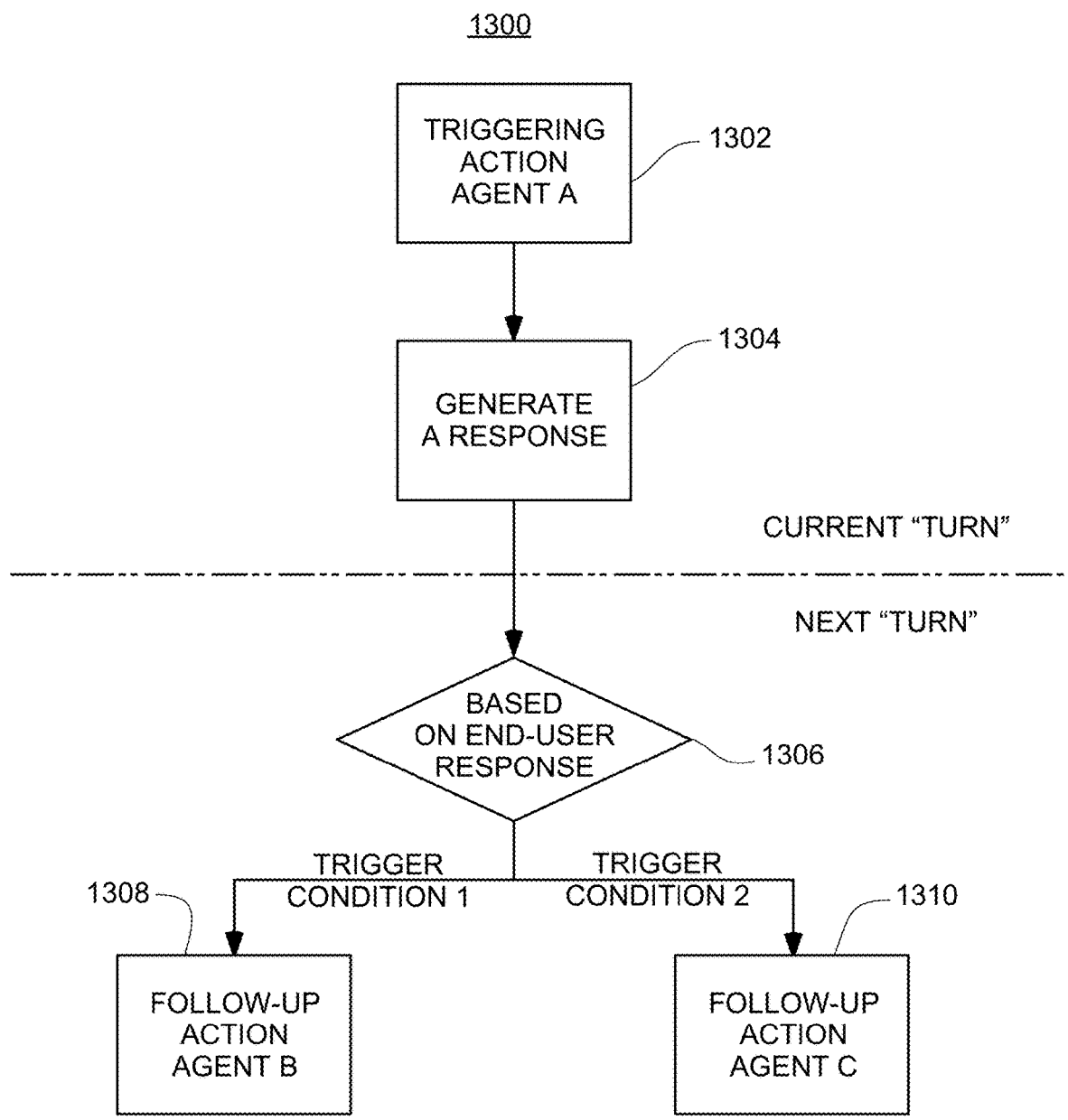
FIG. 13 shows a diagram illustrating an architecture of a follow-up connection from a triggering action agent spanning two conversation turns, in accordance with example embodiments of the disclosure.

Another feature of action agents is their ability to set up follow-up action agent(s), as illustrated in FIG. 13. Diagram 1300 illustrates an architecture comprising follow-up action agents 1308 and 1310 from triggering action agent 1302 spanning two conversation turns, in accordance with example embodiments of the disclosure. Action agent 1302 generates a bot response 1304 to the end user in the current turn. In the next turn and based on the end user's response, decision block 1306 triggers one or more follow-up agents 1308 or 1310. If trigger condition 1 is satisfied, then action agent 1308 is triggered; otherwise, if trigger condition 2 is satisfied, action agent 1310 is triggered. In some embodiments, the triggered follow-up action agent 1308 or 1310 may be an instance of the same agent as the original triggering agent 1302. Additional details on follow-up agents are provided in the section on Service.

Table 2 shows a sample dialogue containing a follow-up action agent. In this example, the follow-up action agent ("Membership Status Check Action Agent") is an instance of the same agent the original triggering action agent ("Membership Status Check Action Agent").

TABLE 2

Dialog Example Using a Membership Status Check Action Agent

| Dialog Sequence | Modules Involved | Comment |
| --- | --- | --- |
| (user): "Hi, can i check my membership status?" | Membership Status Check Action Agent is activated. | User inquiry. |
| (bot): "Certainly, please tell me your email address first" | Email Info Agent | Email Info Agent is a prerequisite, and since we don't know the value and can't infer it, it will simply survey it. |
| (user): "My email address is tom@gmail.com" | | User response. |
| (bot): "Hi Tom, good news, your membership status is active" | Membership Status Check Action Agent generates this. | With all the prerequisite condition met, the Action Agent goes ahead to invoke an external API call to check the status and generate a reply to end user. |

6. Relationship Among Information and Action Agents

One benefit of the present invention lies in the flexible inter-relationship (cross-connections) among different conversation building blocks or agents. The cross-connections between info agents and action agents makes it possible for the virtual assistant platform to handle different scenarios and render a variety of conversation behaviors using a relatively small number of agents.

Figure 14:
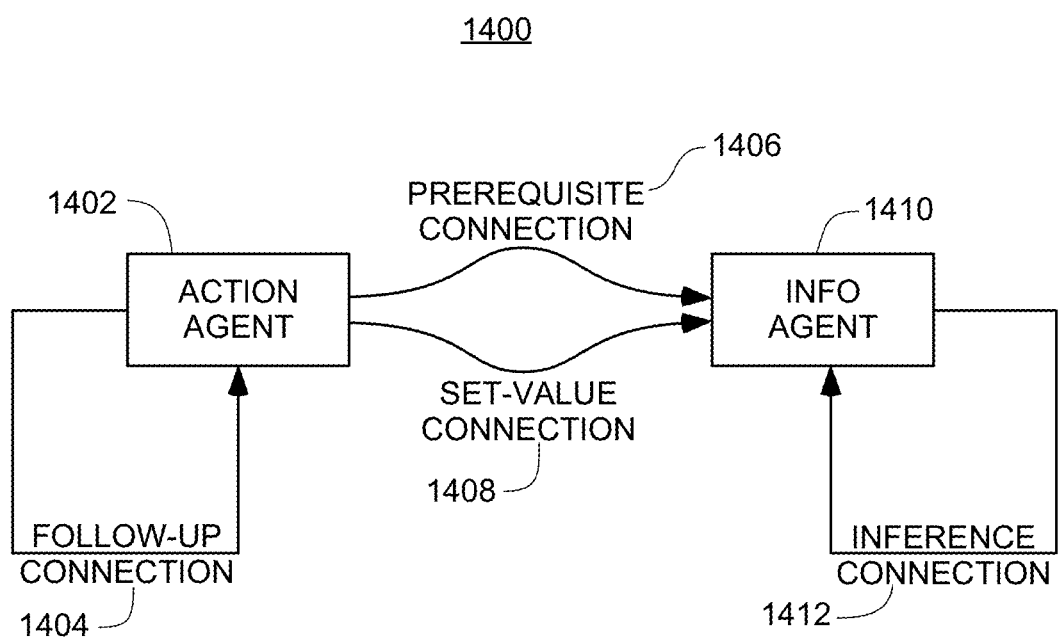
FIG. 14 shows a diagram illustrating schematically four illustrative types of relationships between info agents and action agents, in accordance with example embodiments of the disclosure.

FIG. 14 shows a diagram 1400 illustrating schematically four illustrative types of relationships between action agents 1402 and info agents 1410, in accordance with example embodiments of the disclosure: prerequisite connection 1406, set-value connection 1408, follow-up connection 1404, and inference connection 1412, which are discussed in turn.

6.1 Prerequisite Connection between Action Agent and Info Agent

An action agent 1402 can specify zero or multiple info agent(s) 1410 as prerequisite connections 1406, or necessary pre-conditions. This means that after an action agent 1402 is activated, the virtual assistant platform will first ensure that all the information values associated with the info agent(s) 1410 configured as prerequisite connections 1406 by the action agent 1402 are fulfilled before the actual "action" can be executed.

Note that an info agent 1410 can be shared by different action agents 1402 as prerequisite connections 1406 as part of the configuration data. And at runtime, the same info agent 1410 can also be shared and re-used for different invocations of action agents 1402. The information value associated with such info agent 1410 can remain the same, but it can also evolve as the conversation progresses. One common scenario illustrating an information value change is due to the end user's own doing. For example, "I like to order Happy Meal Number 1", "Okay, any side order?", "Wait, I changed my mind, I want Happy Meal Number 2 instead".

For example, illustrated in declarative language, a prerequisite connection may be specified as follows:

Prerequisite (<Action Agent>)=a set of <Info Agent(s)>

For example:

Prerequisite (<Order Return Action Agent>)=[<Order ID Info Agent>, <Order Product Info Agent>, <Quantity Info Agent>]

6.2 Set-Value Connection between Action Agent and Info Agent

An action agent 1402 can also explicitly set values for application variables for future reference, which may be connected info agents 1410 via set-value connections 1408. This helps certain info agents 1410 to compute the information value more efficiently or become sharable/re-usable information for other action agents to follow-up. Typically, this set-value connection 1408 takes place after an action has taken place, and based on the result, the action agent 1402 can decide to set certain variable values of certain info agents 1410.

6.3 Follow-Up Connection among Action Agents

As explained in the previous section, an action agent 1402 can also specify another action agent 1402, including another instance of itself, as a possible follow-up action agent 1402 after a response from a user, with a particular triggering condition, via follow-up connection 1404.

For example, illustrated in declarative language, a follow-up connection may be specified as follows:

FollowUp(<Action Agent>, <Response>, <Trigger Condition>)=<Action Agent>

For example:

FollowUp (<Order Return Action Agent>, "Return process has been requested, would you like to track the return status?", "Yes_Reply_Trigger_Condition")=<Return Status Tracking Action Agent>

6.4 Inference Connection among Info Agents

A given info agent 1410 can also infer its information value by leveraging other info agents 1410 via an inference connection 1412. In various embodiments, the inference connection 1412 may involve guidance from semantic knowledge or domain specific ontology.

For example, illustrated in declarative language, an inference connection may be specified as follows:

Infer (<Inferer Info Agent>)=<Inferee Info Agent>

For example:

Infer (<Order ID Info Agent>)=<Order Product Info Agent>

In the section "Service Orchestration and Anatomy of Conversation Building," more detail is provided on how the masterbot can take advantage of the inference connection 1412 between info agents 1410 to provide a more intelligent follow-up question generation to obtain the necessary information from the end user.

7. Creating New Services Using Information and Action Agents 7.1 Logical Form

On the virtual assistant platform, a new service may be expressed in a simple logical form, for example, using a declarative language, by defining an action agent comprising prerequisite info agents and an action to be performed, as shown schematically in Table 3.

TABLE 3

Sample Service Expressed in Logical Form

| | |
|---|---|
| Definition | Action Agent A = Service X (R1, R2, R3) |
| Comments | R1, R2, and R3 are prerequisite info agents for the service action, and Service X is the actual action performed by the Action Agent A. |

The virtual assistant platform will automatically manage, among other things:

Determination of triggering condition to invoke the action agent that performs the service.

Examination of all the connected info agent(s) to fulfill the prerequisite information values by performing "understanding," "inference," and if needed, "survey" modes via automated dialog generation, as discussed.

Action execution and generation of replies back to the end user.

Figure 15:
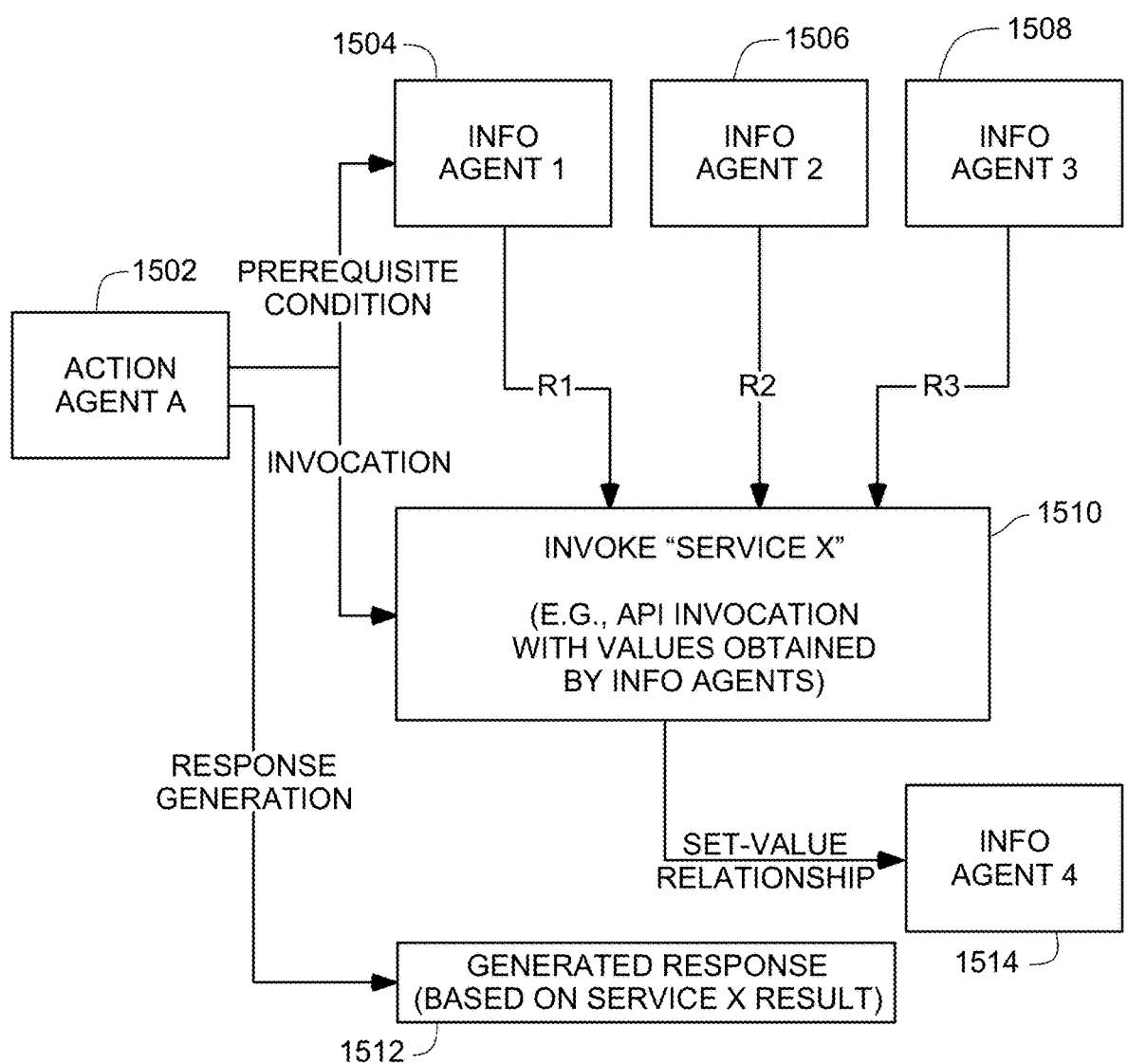
FIG. 15 shows a diagram illustrating logic flow for designing a new service using the virtual assistant platform, in effect teaching the virtual assistant platform to perform a new skill, in accordance with example embodiments of the disclosure.

FIG. 15 shows a diagram 1500 illustrating a logic flow for designing a new service using the virtual assistant platform, in effect teaching the virtual platform to perform a new skill, in accordance with example embodiments of the disclosure. Action agent 1502 has prerequisite conditions comprising info agents 1504, 1506, and 1508, via prerequisite connections R1, R2, and R3, respectively. For invocation, the Service X is invoked as specified in action invocation condition 1510, which may typically be an API invocation with parameters transformed from the information value(s) obtained via prerequisite info agents 1504, 1506, and/or 1508. In some embodiments, the action invocation condition 1510 may also specify a set-value relationship to one or more other info agents 1514, as described above. Finally, a response generation is specified in generated response condition 1512, which may typically be based on a template system based on a result obtained from the Service X.

7.2 Basic Example

A basic example consists of a basic action agent that can tell time. Table 4 shows a sample conversation with an action agent that can tell time.

TABLE 4

Dialog Example Rendered by a Single Action Agent with No Info Agents as Prerequisite

| Dialog Turn Sequence | Modules Involved | Comment |
|---|---|---|
| (user): "What time is it?" | Local Time Action Agent in activated | Local Time Action Agent has no Info Agent requirement. |
| (bot): "It is 11:05 pm PT" | Generated by Local Time Action Agent | Response generated. |

7.3 Single Action, Standard Service Example

A more complicated example involves a "Return Action Agent" that requires three info agents before it can perform any return verification or return slip generation. Note that in practice, a majority of the services fall into this "Single Action with Info Agent(s) as Prerequisites" design pattern. Table 5 shows a sample conversation comprising a single action agent with an info agent as a prerequisite.

TABLE 5

Dialog Example Rendered by a Single Action Agent with Info Agent(s) as Prerequisites

| Dialog Turn Sequence | Modules Involved | Comment |
|---|---|---|
| (user): "Can I return my T-shirts that I purchased last week?" | Return Action Agent is activated | Return Action has 3 info agents as its prerequisites: Order Info Agent, Order Product Info Agent and Quantity Info Agent |
| (bot): "There are two of them, are you referring to the blue T-shirt or the red one." | Order Product Info Agent generated the response | Order Info Agent value is fulfilled since Order Info Agent discovered that there is only one order placed last week. Order Product Info Agent cannot be certain which T-shirts that the end user is referring to, therefore, it will generate the response back to end-user to choose. |
| (user): "The blue one." | Order Product Info Agent" | Order Product Info Agent value is fulfilled since it now confirms which product item end-user was referring to; Quantify Info Agent value is also automatically inferred because there is only one blue t-shirt ordered. |
| (bot): "Okay, I have generated a return slip and sent to your email address at tom@gmail.com" | Return Action Agent | Return Action Agent invokes the service to generate a return slip and sends it to the end user; upon success, it generates a reply to the end user. |

7.4 Action Agent that Follows-up Another Action Agent

Sometimes, a service can consist of multiple action agents which are interrelated with each other via a follow-up connection. Refer back to FIG. 13 for an example, which shows an architecture comprising follow-up action agents 1308 and 1310 from triggering action agent 1302 spanning two conversation turns.

7.5 Example—Single Service with Multiple Action Agents

Figure 16:
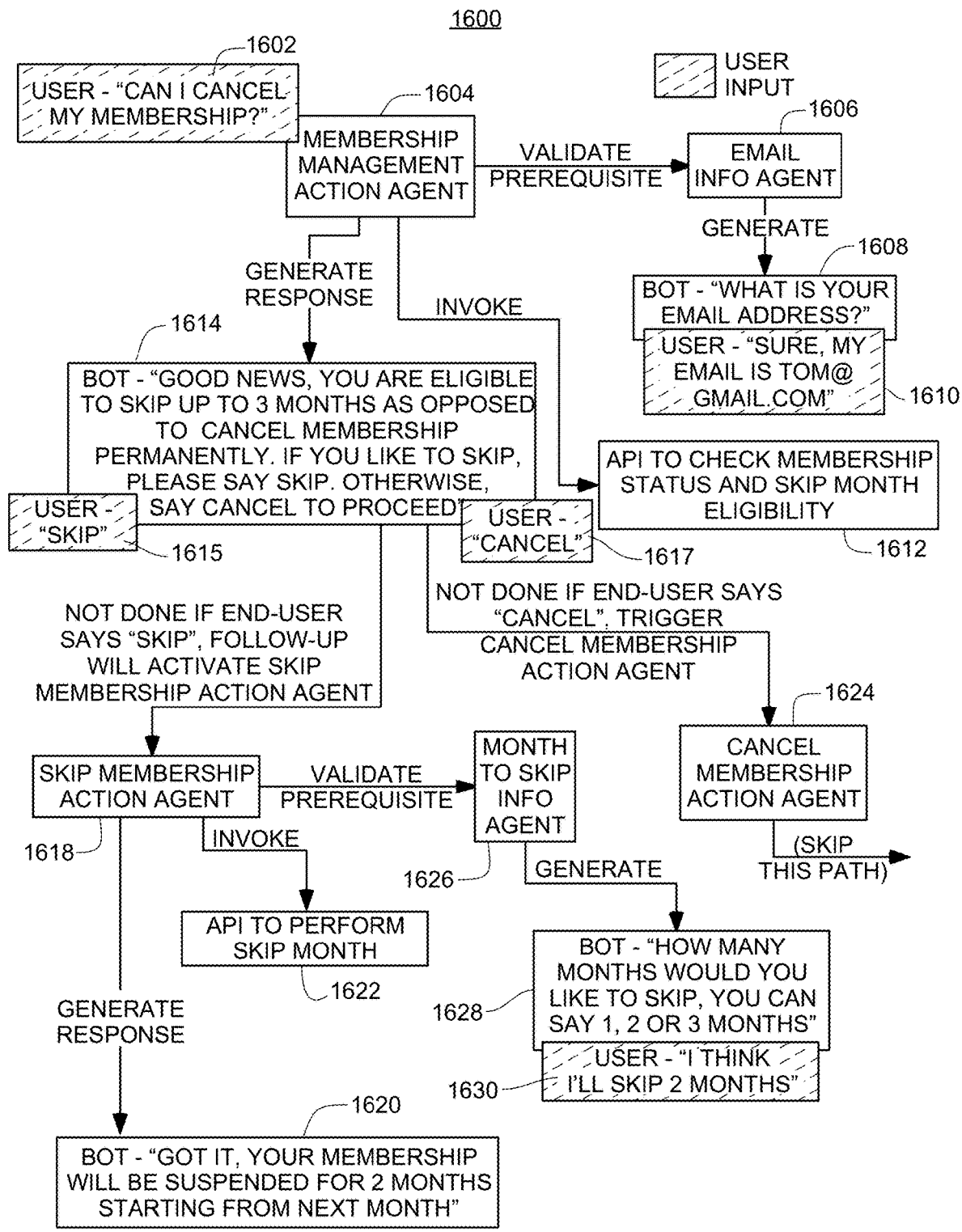
FIG. 16 shows a diagram illustrating process flow of a service comprising multiple action agents, in accordance with example embodiments of the disclosure.

FIG. 16 shows a diagram 1600 illustrating a process flow of a service comprising multiple action agents, in accordance with example embodiments of the disclosure. Table 6 shows a dialog example rendered by a single service with multiple action agent(s) connected via a follow-up. Note both the diagram 1600 in FIG. 16 and the dialog sample in Table 6 illustrate the same conversation sequence. The blocks in FIG. 16 are referenced in the corresponding Table 6.

TABLE 6

Dialog Example Rendered by a Single Service with Multiple Action Agent(s) Connected via Follow-up

| Dialog Turn Sequence | Modules Involved | Comment |
|---|---|---|
| (user): "Can I cancel my membership?" 1602 | Membership Management Action Agent 1604 is activated | Membership Management Action Agent 1604 has one prerequisite info agent: Email Info Agent 1606 |
| (bot): "What is your email address?" 1608 | Email Info Agent 1606 generated the reply | Email Info Agent 1606 information value is not fulfilled (neither via understanding nor inference), so Email Info Agent 1606 decides to query the end user. |
| (user): "Sure, my email is tom@gmail.com" 1610 | Email Info Agent 1606 | Email Info Agent 1606 information value is now fulfilled; Next, Membership Management Action Agent 1604 invokes an API 1612 to check membership status and finds out that the end user is eligible for skipping up to 3 months. |
| (bot): "Good news, you are eligible to skip up to 3 months as opposed to cancel membership permanently. If you like to skip, please say skip. Otherwise, say cancel to proceed" 1614 | Membership Management Action Agent 1604 generated a reply | Membership Management Action Agent 1604 sets up 2 follow-up action agents. If end user says "skip," Skip Membership Action Agent 1618 will be activated. If end user says "cancel," Cancel Membership Action Agent 1624 will be activated. |
| (user): Skip 1615 | Skip Membership Action Agent 1618 is triggered | Skip Membership Action Agent 1618 is triggered. |

TABLE 6-continued

Dialog Example Rendered by a Single Service with Multiple Action Agent(s) Connected via Follow-up

| Dialog Turn Sequence | Modules Involved | Comment |
|---|---|---|
| (bot): "How many months you like to skip, you can say 1, 2 or 3 months." 1628 | Month to Skip Info Agent 1626 | Skip Membership Action Agent 1618 has a prerequisite of Month to Skip Info Agent 1626. Since there is no value set, Month to Skip Info Agent 1626 will generate a query to ask the end user for the value. |
| (user): "I think I'll skip 2 months" 1630 | Month to Skip Info Agent 1626 | With the new utterance, Month to Skip Info Agent 1626 can fulfill the information value to "2". |
| (bot): "Got it, your membership will be suspended for 2 months starting from next month" 1620 | Skip Membership Action Agent 1618 | With all the prerequisites satisfied, Skip Membership Action Agent 1618 will go ahead and invoke the external API service 1622 to officially suspend the membership. |
| (user): "Cancel" (not shown) | Membership Management Action Agent 1604 | Alternatively, if the user had elected to "cancel" their membership, then the alternative triggering condition would lead to triggering of Cancel Membership Action Agent 1624, which would trigger an external API service call to cancel the membership. |

8. Service Orchestration and Anatomy of Conversation Building 8.1 Role of the Masterbot It is not sufficient to operate a multi-service virtual assistant with just a set of action agents and info agents. A special masterbot (also called an arbiter or arbiter agent) is needed to arbitrage, resolve conflict, and facilitate among all the available agents to render a versatile and fluid conversation with end users. This section described how the masterbot functions according to one embodiment of the present invention.

In one embodiment, the masterbot handles the following functions:

Action agent arbitration and invocation.
Info agent dependency checking, fulfillment, and sharing/re-using across different action agents or the same ones.
Management of dialog flow and application state to navigate action agents.

Refer back to FIG. 2, which shows an architecture of the virtual assistant platform, and illustrates the high-level role of the masterbot 204 and the relationship between the masterbot 204 and the plurality of action agents 208 and info agents 210.

As mentioned, conversations are assembled from execution of conversation building blocks—info agents and/or action agents. For the masterbot to be able to select and manage the flow of these various agents, the masterbot needs to leverage a few other components:

NLU module for intent, follow-up intent, speech act, and so on.
Sentiment analysis.
Domain service ontology—the logical relationship among different services.
Contextual data for personalized and situational adjustment.

This section focuses on how the masterbot leverages the above clues to make the overall system function efficiently.

8.2 Workflow of the Masterbot

Figure 17:
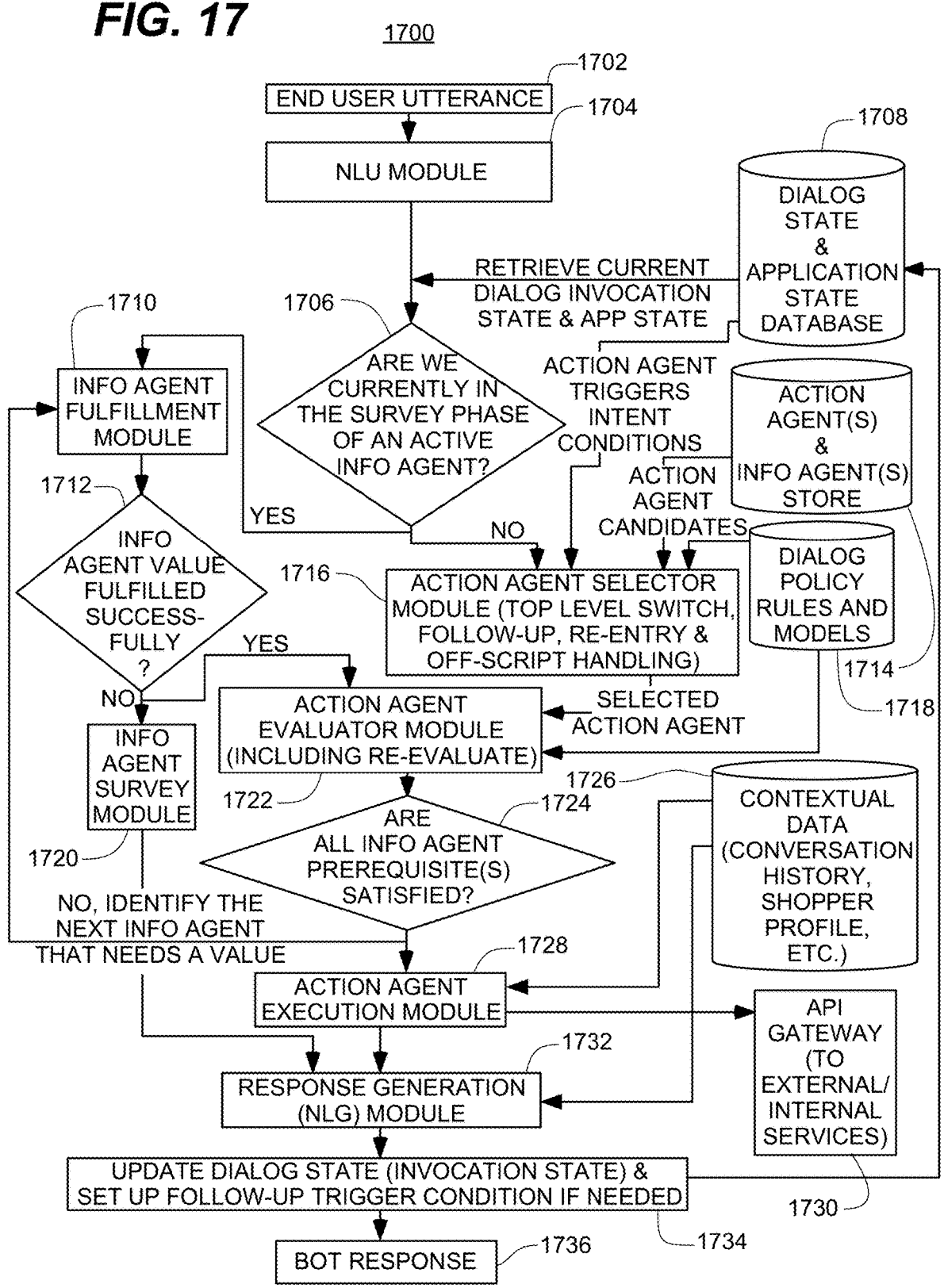
FIG. 17 shows a diagram illustrating components and process flow of the masterbot, in accordance with example embodiments of the disclosure.

FIG. 17 shows a diagram 1700 illustrating components and a process flow of the masterbot, in accordance with example embodiments of the disclosure. End user utterance 1702 is processed via NLU module 1704 to extract language constructs data, user intent, classification, entity extraction, speech act analysis, sentiment analysis, and so forth. First, the current dialog invocation state and application state is retrieved from the dialog state and application state database 1708.

Next, a decision step 1706 determines whether or not the system is currently in the survey phase of an active info agent. If yes, the process proceeds to info agent fulfillment module 1710. At decision step 1712, it is determined whether or not the info agent's information value has been successfully fulfilled. If not, then info agent survey module 1720 is triggered to survey the user for the information value using the natural language generation (NLG) module 1732. If yes, then action agent evaluator module 1722 is triggered.

Next, at decision step 1724, it is determined whether or not all info agents, which are prerequisite conditions to the given action agent, are satisfied. If not, the process reverts back to info agent fulfillment module 1710 to identify the next info agent that needs an information value fulfilled to fulfill any missing prerequisite info agents. If yes, then action agent execution module 1728 is triggered, which relies on contextual data store 1726 and/or API gateways 1730 to external or internal services, as appropriate, to fulfill the action agent output conditions. Finally, response generation module 1732 for natural language generation (NLG) is triggered, which generates both a bot response 1736, as well as updates the dialog state (invocation state) and sets up follow-up trigger conditions 1734, if necessary. The updated dialog state and the follow-up trigger conditions, if any, are then passed to the dialog state and application state database 1708, which in turn provides this information to the decision block 1706 for execution at the next dialog turn.

If at decision step 1706, it is determined that the system is not currently in the survey phase of an active info agent, then action agent selector module 1716 is triggered, which handles top level switching, follow-up, re-entry, and off-script handling, as appropriate. The action agent selector module 1716 relies on input from the dialog state and application state database 1708, action agent and info agent store 1714, as well as dialog policy rules and models 1714 to select the appropriate action agent for execution. Once a given action agent is selected for execution, then the action agent evaluator module 1722 is triggered, and the process proceeds as above.

8.2.1 Action Agent Arbitration Process

Although there are many possible implementation techniques to support the masterbot functionality requirement of action agent selection (aka arbitration), this section describes a possible solution that, in addition to the standard text annotation and intent classification method, can leverage a domain specific concept ontology to exploit additional semantic and logical relationships between different concepts (and therefore their associated action agents) for a better overall user experience. The flexibility of using different strategies of selecting the best suitable action agent to adapt to the current conversation flow is an important benefit of this invention. This section also explains how a rule-based system can be turned into a machine learning based approach as the system collects more and more conversational data.

Figure 18:
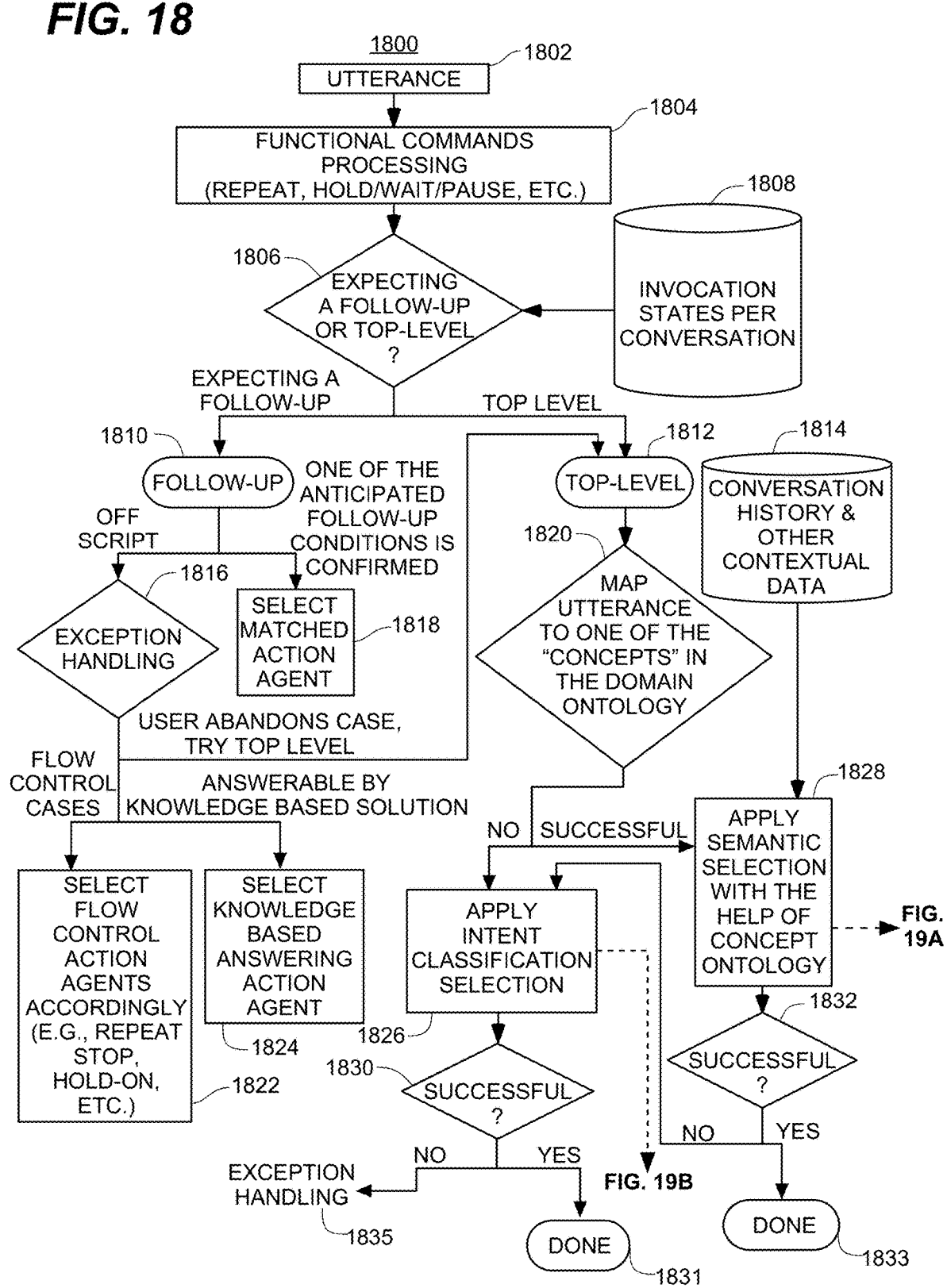
FIG. 18 shows an action agent selection method utilizing a concept ontology classification and a text-based intent classification, in accordance with example embodiments of the disclosure.

FIG. 18 shows a diagram 1800 of an action agent selection method utilizing a concept ontology classification and a text-based intent classification, in accordance with example embodiments of the disclosure. The end user's utterance 1802 is processed to determine a functional command 1804 that is processing state independent to handle common conversation flow control commands (e.g., repeat, hold/wait/pause, etc.). For example, if the user utterance is "Hold on", the masterbot can assign a special utility action agent to respond with something like "Sure, take your time", or alternatively, simply remain silent for the end user to proceed with the next turn.

At decision step 1806, it is determined whether the masterbot is expecting a "follow-up" situation or a "top-level" situation based on the invocation states per conversation 1808. These two terms are used to distinguish two major dialog state situations—is the masterbot proactively anticipating something specific from the end user (expecting a "follow-up" from the end user) or is the masterbot simply going to be reactive to what the end user says ("top-level"). An example of a "follow-up" occurs when the masterbot asks the end user for clarification or additional information. For example, the end user starts with "Can I order something to eat?" and bot says, "Is this for here or to go?". At this point, the masterbot is expecting two follow-up scenarios: "eat here" or "to go". This is a different situation than the first question, which corresponds to a "top-level" situation. For each case, the masterbot can apply a rule-based approach to make a sound action agent selection decision. In case it is a "follow-up" situation, the process branches to the left to the follow-up branch 1810; whereas in case it is a "top-level" situation, the process branches to the right to the top-level branch 1812. The follow-up branch (left) 1810 and the top-level branch (right) 1812 are each discussed in turn.

In the case it is a follow-up situation and the process branches to the left, if one of the anticipated follow-up conditions is confirmed, then the matched action agent is selected for triggering at step 1818. Otherwise, in case it is an off-script response from the user, exception handling step 1816 is triggered. In one scenario, the user abandons that train of thought, and the process reverts to the top-level branch 1812. Otherwise, the process selects one branch of several possible flow control cases, either selecting flow control action agents accordingly at step 1822 or selecting knowledge-based answering action agents at step 1824.

In the case it is a top-level situation and the process branches to the right to the top-level branch 1812, at decision step 1820, the process maps the utterance to one of the concepts in the domain ontology. If the concept mapping 1820 is successful, then the process applies a semantic selection with the help of the concept ontology process at step 1828, which relies on help from the conversation history and other contextual data 1814. An example of the semantic selection with concept ontology process is described in relation to FIG. 19A. If the semantic selection with concept ontology process is successful, as determined in decision step 1832, then the process is complete with an action agent chosen at step 1833. Otherwise, the process applies a text-based intent classification selection process at step 1826, described next.

If the concept mapping 1820 is not successful, then the process applies a text-based intent classification selection process 1826. The text-based intent classification selection process is described in relation to FIG. 19B. If the text-based intent classification selection process is successful, as determined in decision step 1830, then the process is complete with an action agent chosen at step 1831. Otherwise, if the text-based intent classification selection process is not successful, then exception handling 1835 is triggered to handle various classes of exceptions.

8.2.2 Action Agent Selection using Concept Ontology Classification

Figure 19A:
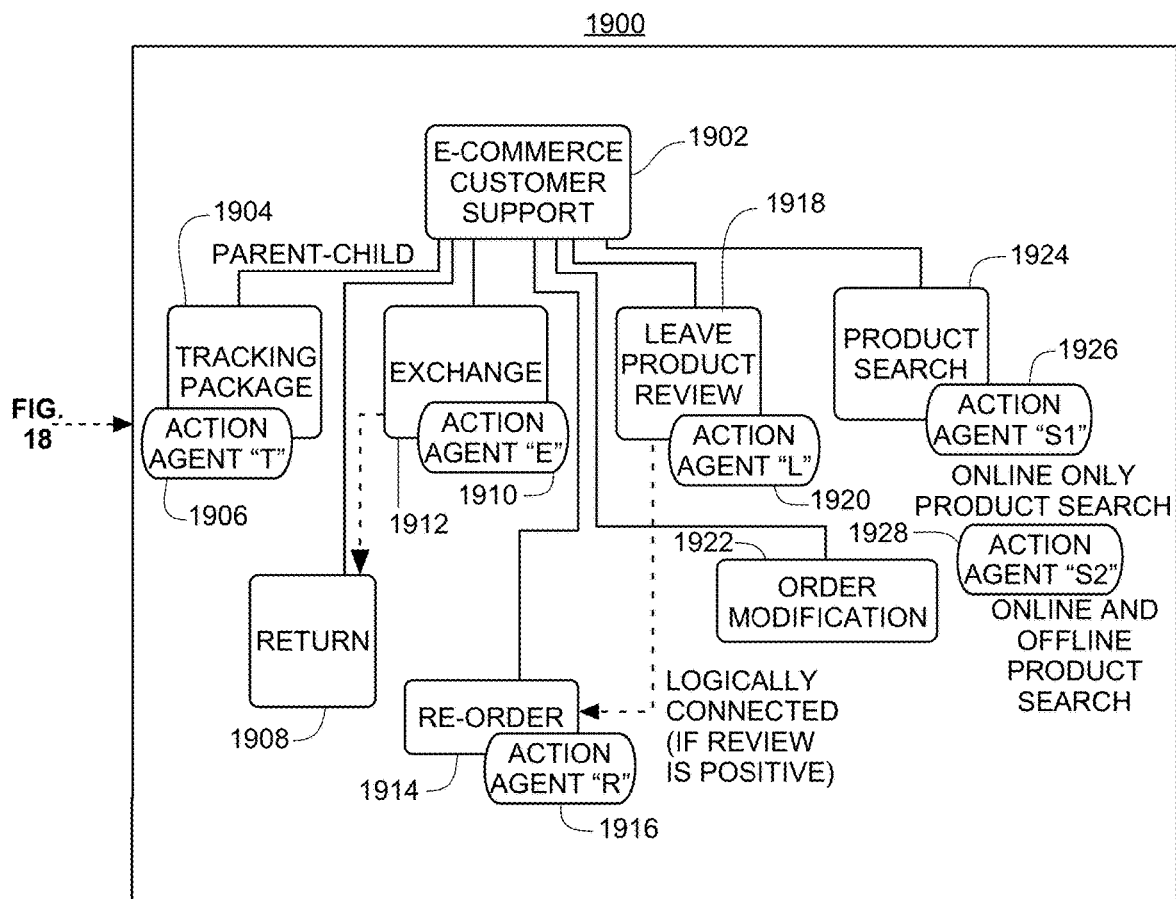
FIG. 19A shows a diagram illustrating a concept ontology classification example, in accordance with example embodiments of the disclosure.

FIG. 19A shows a diagram 1900 illustrating a concept ontology classification example, in accordance with example embodiments of the disclosure. A concept ontology classification is shown having nine concepts in three layers with six action agents associated with five of them. The ontology allows the masterbot to apply domain knowledge to respond to end user utterances better with the action agents available at hand. Four examples are shown for an illustrative e-commerce customer support platform 1902:

If the utterance is mapped to "Tracking Package" 1904, the masterbot can directly choose to invoke Action Agent "T" 1906.

If the utterance is mapped to "Return" 1908, and there is no action agent that is directly attached to "Return," then the masterbot can invoke Action Agent "E" 1910 to assist the user with an option to exchange an item 1912, instead of returning it.

If the utterance is mapped with medium confidence to "Re-Order" 1914 (as well as something else like an Order Modification 1922) and previously the end user had completed a positive product review 1918 via Action Agent "L" 1920, whereas normally the masterbot cannot be sure of the end user's intent, but in this case, it is much more likely that it should select the Re-Order Action Agent "R" 1916.

If the utterance is mapped to "Product Search" 1924, and there are more than one action agent(s) 1926 and 1928 that can answer the request, the masterbot can use empirical data to choose one over the others.

To illustrate, consider a simple example of how domain ontology can be leveraged to assist the masterbot with selecting an action agent. Suppose the masterbot is equipped with a mini hierarchical concept ontology with just nine concepts as shown in diagram 1900. Shown in diagram 1900 are parent-child relationships (also known as "Is Member" relationships) as well as semantic relationships (e.g., Return 1908 and Exchange 1912 are often related to each other because shoppers can choose either one), or just logically connected in chronological sequence or causal relationship like Leave Product Review 1918 and Re-Order 1914. During the configuration/design time, four action agents are configured to be associated with five of the eight concepts for direct triggering.

At run-time, different utterance inputs and conversation histories can affect how the masterbot makes the action agent selection decision, as illustrated in the below examples, corresponding to the four examples summarized above.

- If the utterance is unequivocally identified as one of the four concepts, the masterbot can simply choose the corresponding action agent. For example: "Where is my package?" maps to "Tracking Package" concept 1904, and therefore Action Agent "T" 1906 will be selected.
- If the utterance is mapped to Return 1908, the masterbot understands that there is no action agent assigned to the Return concept 1908. However, the Action Agent "E" 1910 can assist the end user to initiate an Exchange 1912 instead, since this is a good option for many shoppers as understood by the masterbot. The masterbot can choose to select Action Agent "E" 1910 (which can perform the exchange function) directly. Alternatively, the masterbot can ask the end user if they would like to invoke Action Agent "E" 1910. This sort of conversation with the end user can be accomplished by a utility "Disambiguation Action Agent" (not shown) whose sole responsibility is to obtain feedback from end users to assist the main action agent selection process.
- If the utterance is modestly mapped to Re-Order 1914 (as well as something else like an Order Modification 1922) and previously the end user had completed a positive product review (via previously activated Action Agent "L" 1920), whereas normally the masterbot would not be confident on the action agent selection, in this case, it is more likely the masterbot should be inclined to select the Re-Order Action Agent "R" 1916. Note that if the masterbot is not very confident, similar to the previous case, it can ask a "Disambiguation Action Agent" (not shown) to help get user feedback and proceed accordingly.
- If the utterance is mapped to the Product Search concept 1924, and the masterbot finds out there are two action agent(s) 1924 and 1926 that can answer this request, the masterbot can use empirical data to choose one over the other. For example, if one Action Agent "S1" 1926 searches against an online-only catalog, and another Action Agent "S2" 1928 can conduct searches against both online and brick-and-mortar in-store (offline) searches, the masterbot can use empirical data to choose one.

Figure 19B:
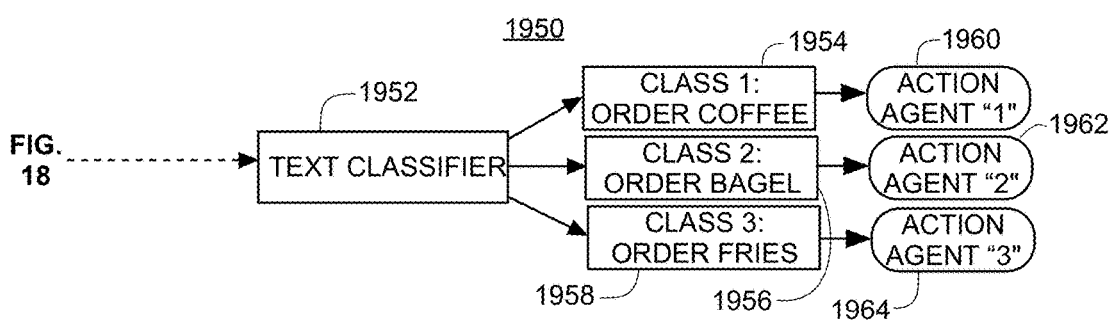
FIG. 19B shows a diagram illustrating a text-based intent classification example, in accordance with example embodiments of the disclosure.

FIG. 19B shows a diagram 1950 illustrating a text-based intent classification example, in accordance with example embodiments of the disclosure. A text-based intent classification example is shown, comprising three classes, with an action agent associated with each of them. A text classifier 1952 classifies the user utterance into one of three classes 1954, 1956, or 1958. Each of the three classes 1954, 1956, and 1958 have an action agent 1960, 1962, or 1964 associated with each of them, respectively. Based on the output from the text classifier 1952, one of the three action agents 1960, 1962, or 1964 is selected based on the matching class.

8.2.3 Machine Learning Based Approach for Action Agent Triaging/Selection

The masterbot can be implemented with different implementation strategies with regards to action agent selection, depending on the developer's preferences and availability of certain resources or toolsets. In some embodiments, a rule-based selection process is used for selecting action agents. In other embodiments, a data-driven machine learning selection process is used.

Within the machine learning selection process, the choice of the specific implementation can vary. One approach is to consider top-level action agent selection as an "n-class" classification problem. Table 7 illustrates the various data records that a virtual assistant platform can collect and use for training data to build a model for making the optimal action agent selection, illustrating a sample list of data categories that a machine learning approach can leverage.

TABLE 7

Sample List of Data Categories that a Machine Learning Approach Can Leverage

| Input vs Output in Conceptual group | Data Description | Data Source | Comment |
|---|---|---|---|
| Input | Top Intents identified-name and scores | NLU module | Based on utterance of current turn |
| Input | Entity Extraction-existence and scores of entity types found | NLU module | Based on utterance of current turn (e.g., email address, order number, temporal vs. spatial) |
| Input | Sentiment score | NLU module | Based on utterance of current turn and/or overall conversation |
| Input | Order Status-active order count, in-transit order count, recently delivery order count, etc. | Contextual data store-this is usually domain specific | What is known about the end-user |
| Input | Shopper profile-gender, household income bucket, average order size, total orders made, return ratio, etc. | Contextual data store-this is usually domain specific | What is known about the end user |
| Input | Conversation history-past sentiment score, invoked Service X in last | Contextual data store-past conversation | The memory of previous conversations |

TABLE 7-continued

Sample List of Data Categories that a Machine Learning Approach Can Leverage

| Input vs Output in Conceptual group | Data Description | Data Source | Comment |
|---|---|---|---|
| | 24 hours, invoked Service Y in last 7 days, etc. | history | |
| Output (target) | Action agent selected | Based on past conversations | Training data can be manually annotated by humans, or automated collected based on strong evidence of successful conversation (e.g., gratitude and/or ticket closure confirmation by end user) |

8.2.4 Optimal Info Agent Invocation via Inference-Based Selection Process

As described earlier, once the masterbot identifies the need for activating an action agent, the masterbot will first examine the prerequisite conditions to evaluate the associated info agent(s) to confirm the information values are present and sufficient. If this is not the case, the masterbot will activate the required info agent to start the information survey sub-dialog with the user (e.g., asking the end user follow-up questions) to help gather the necessary information. In other embodiments, the masterbot can do better if the info agent implementation can self-report the inference relationship between itself and other info agents at run-time. In this case, the masterbot can use empirical data to examine all the possible info agents (i.e., the original info agent as well as its fellow info agents with inference connections) and make a decision to select one.

The following dialog sequence illustrates this capability:

Step 1: The end user says, "Can I return my T-shirts?" over the Alexa Echo device.

Step 2: The masterbot identifies that it should select a "Return Action Agent", which has a "Order Number Info Agent" configured as one of its prerequisites.

Step 3: The masterbot evaluates "Order Number Info Agent" and finds out that it does not have the information value yet; at the same time, it was reported that there are two connected info agents that could be used for inference: "Order Purchase Date Info Agent" and "Order Product Item Info Agent", both of them don't have their corresponding information values set yet.

Step 4: To generate a follow-up question to the user for surveying the Order Number value, the masterbot now considers three options between "Order Number Info Agent", "Order Purchase Date Info Agent", and "Order Product Item Info Agent". Considering that the Order Number value is a long alphanumeric label (e.g., with a format like ORDR9827321029) and based on the historical usage interaction data on voice channels like Alexa, the masterbot finds out that the success rate of asking survey questions like "Please tell me the full order number" is relatively low, the masterbot can decide to use "Order Purchase Data Info Agent" to generate a response. The output would therefore be something like "What was the order purchase date? Last week or on April 15th?"

Step 5: The user replies, "It was from last week". Internally, the "Order Purchase Date Info Agent" information value was fulfilled first and because of that, "Order Number Info Agent" information value also gets fulfilled successfully.

Step 6: Now with the "Order Number Info Agent" information value fulfilled, the masterbot can proceed to other prerequisites, or the final action invocation of the "Return Action Agent".

8.3 Sample Multi-Service Conversation Powered by Masterbot and Nine Agents

FIG. 20 shows a diagram 2000 illustrating a sample multi-service conversation operated by the masterbot and a plurality of info and action agents, in accordance with example embodiments of the disclosure. Diagram 2000 shows the masterbot and all of the conversation building blocks (nine total action and info agents) involved in a sample multi-service-oriented conversation, showing four action agents and five info agents.

The masterbot 2002 has connection to an on-sale product recommendation action agent 2004, which has a product category info agent 2012 and a gender info agent 2014 as prerequisite connections. The on-sale product recommendation agent 2004 also has a set-value connection with product category info agent 2018. A stand-alone thank you action agent 2006 has no pre-requisites, and may be triggered, for example, based on sentiment analysis on the end user utterance, as described previously. A nearby store action agent 2008 has a locale info agent 2016 as a prerequisite connection, and a set-value connection with store info agent 2020. Finally, in-store availability check action agent 2010 has the product category info agent 2018 and the store info agent 2020 as prerequisite connections.

Table 8 shows a multi-service sample dialog from the masterbot's point of view corresponding to the sample multi-service conversation illustrated in diagram 2000.

TABLE 8

A Multi-Service Sample Dialog from the Masterbot's Point of View

| Dialog Turn Sequence | Modules Involved | Comment |
|---|---|---|
| (user): "Can you recommend some jeans that are on sale?" | "On-sale Product Recommendation Action Agent" in activated | Masterbot leverages NLU to determine the product recommendation intent and the selection of "On-sale Product Recommendation Action Agent." |
| (bot 1st response): "Certainly, based on your past shopping preference, here is one that you might like-511 Slim Fit Black Jeans for Women in blue color, size M, it is currently 75% off while supply lasts." | "On-sale Product Recommendation Action Agent" generates the response | Both "Product Category Info Agent" and "Gender Info Agent" are prerequisites of "On-sale Product Recommendation Action Agent". Using utterance (via the help of NLU module), Product Category Info Agent set the value to be "jeans". As for the "Gender Info Agent", its value is automatically inferred based on past order history. With all the requirements fulfilled, Masterbot invoke "On-sale Product Recommendation Action Agent." |
| (user): "Actually this is a gift for my husband" | "Gender Info Agent" | Masterbot detects that it is a statement to modify information (using Speech Act Classification) and re-activate "On-sale Product Recommendation Action Agent" again with a new round of evaluation. When "Gender Info Agent" is re-evaluated, the value changes from "Women" to "Men" (via inference from "husband." |
| (bot 2nd response): "No problem, I found 521 Regular Fit Blue Jeans for Men, size M, it is currently on sale at 50% off" | "On-sale Product Recommendation Action Agent" generates the response | "On-sale Product Recommendation Action Agent" produces a different result based on the new information value. At the same time, "On-sale Product Recommendation Action Agent" sets a "Product Item Recommended Info Agent" value. |
| (user): "Thanks, that is great!" | | "Thank you intent" is identified and Masterbot decided to select "Thank You Action Agent" to respond. |
| (bot 3rd response): "My pleasure, glad that I can help" | "Thank You Action Agent" generated a response | Since there is no Info Agent dependency, "Thank you Action Agent" can be invoked directly. |
| (user): "By the way, can I find a nearby store to check out the jeans?" | "Nearby Store Action Agent" is activated | Now masterbot identifies a nearby store finding intent and selects "Nearby Store Action Agent" to be active. |
| (bot 4th response): "What is your location? You can tell me in city, state or in zip code." | "Locale Info Agent" generated this message | "Locale Info Agent" is a prerequisite of "Nearby Store Action Agent." Since there is no value set, masterbot asks "Locale Info Agent" to conduct a survey and it generates a prompt to ask the end user. |
| (user): "Sunnyvale, California" | "Locale Info Agent" | With the new utterance, "Locale Info Agent" now has its information value set. |
| (bot 5th response): "Got it, your nearby Levi's store is located at 101 Main Street, Sunnyvale". | "Nearby Store Action Agent" generated this message | With all the prerequisites satisfied, "Nearby Store Action Agent" will go ahead and invokes the service to find out the nearest store and respond. At the same time, Nearby Action Agent sets "Store Info Agent" to be the final value for possible future usage by itself and others action agents. |
| (user): "Nice, can you also check the product availability in store?" | "Availability in Store Check Action Agent" is triggered | Masterbot first uses NLU to identify "In Store Product Availability Check" intent and selects "Availability in Store Check Action Agent" The two info agent prerequisites of "Availability in Store Check Action Agent" are "Store Info Agent" and "Product Item Info Agent." "Store Info Agent" has been set earlier by Nearby Store Action Agent and will be re-used. "Product Item Info Agent" value was set |

TABLE 8-continued

A Multi-Service Sample Dialog from the Masterbot's Point of View

| Dialog Turn Sequence | Modules Involved | Comment |
|---|---|---|
| | | from the "Product Item Recommended Info Agent" as well, so that value is re-used as well. |
| (bot 6th response): "Good news, the jeans you were referring to-521 Regular Fit Blue Jeans for Men, size M-is in stock in the Levi's store at 101 Main Street, Sunnyvale." | "Availability in Store Check Action Agent" generates this | With all the prerequisites met, "Availability in Store Check Action Agent" will be able to invoke an external API to check the availability status and answer the question. |

9. Implementation using Computer Program Products, Methods, and Computing Entities 9.1 Overview of Hardware and Software Implementation The present invention may be implemented in a combination of hardware and/or software. An illustrative hardware and software operational environment for implementing one embodiment of the present invention is now described.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magneto-resistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RANI (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to agent diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

9.2 Exemplary System Architecture

Figure 21:
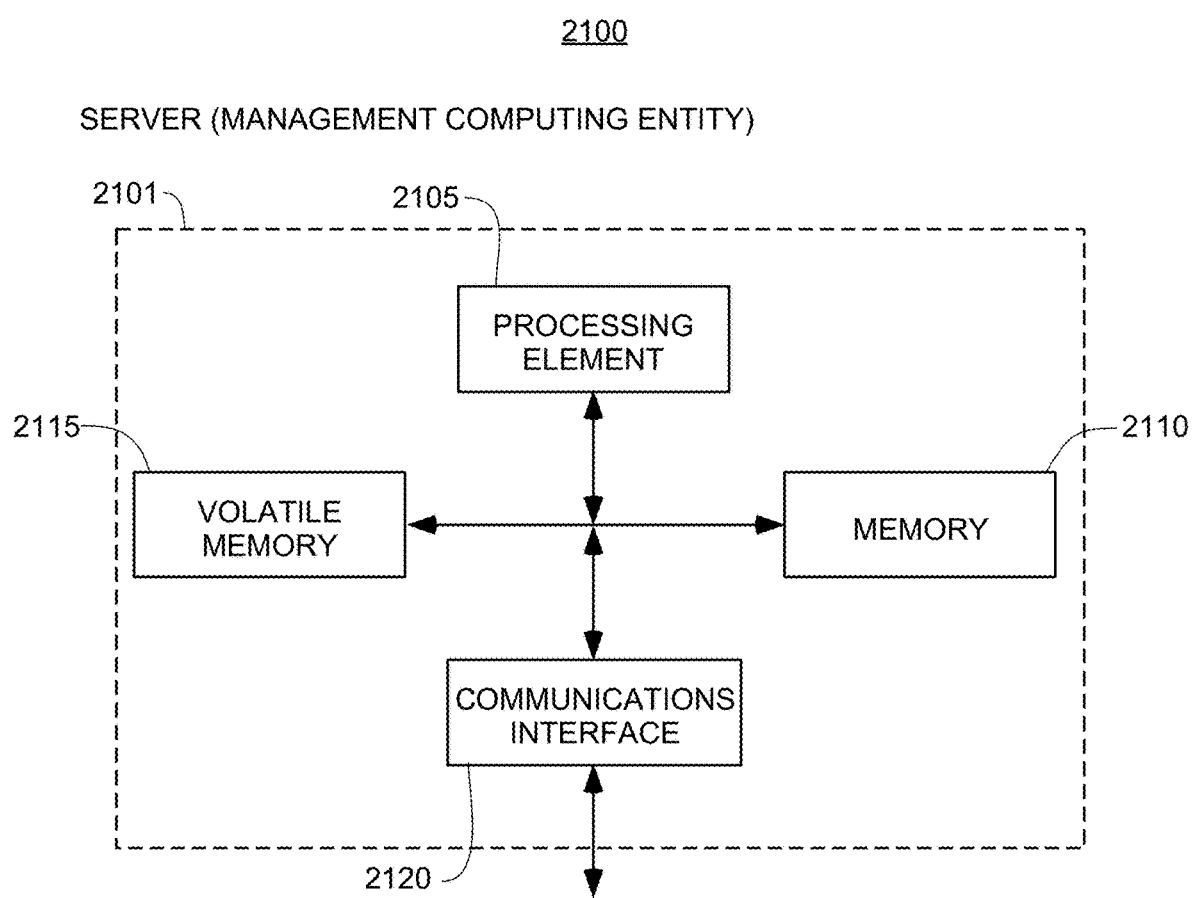
FIG. 21 shows an exemplary schematic diagram of a management computing entity (e.g., server) for implementing the present invention, in accordance with example embodiments of the disclosure.
Figure 22:
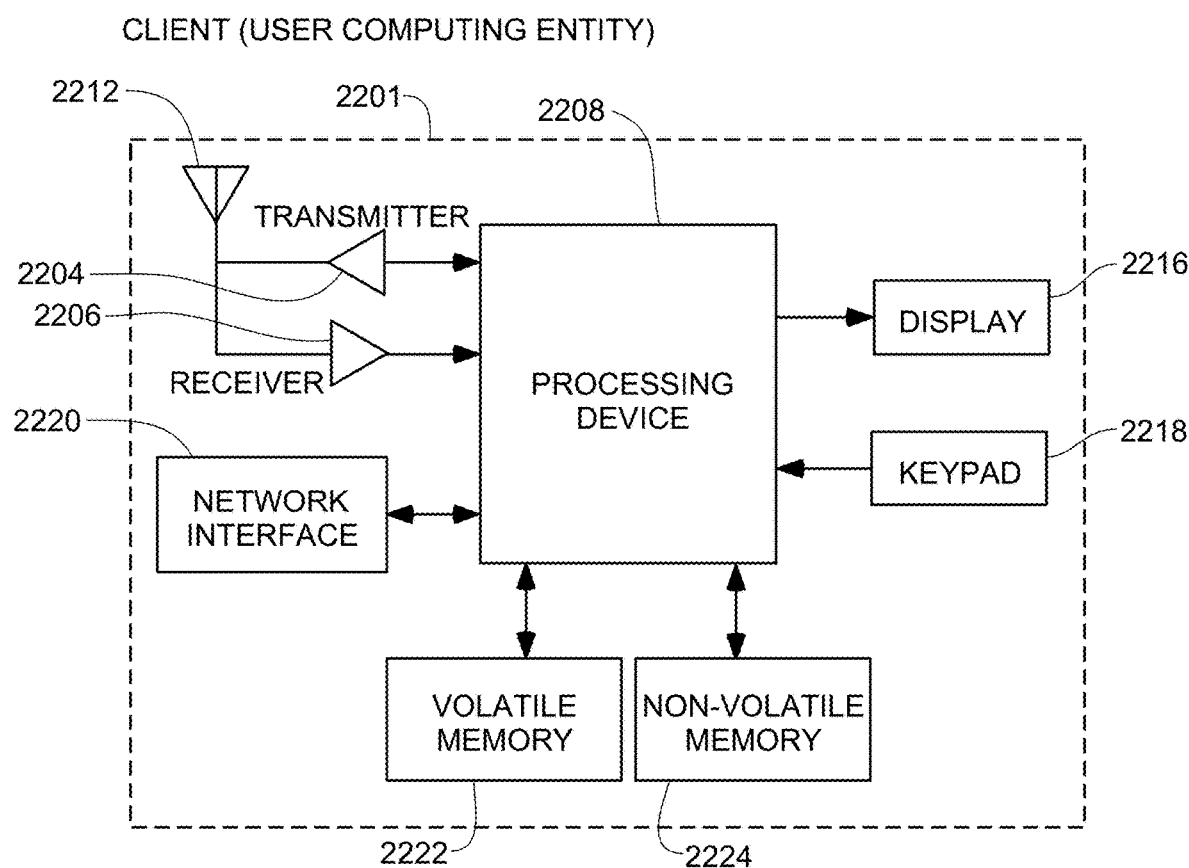
FIG. 22 shows an exemplary schematic diagram of a user computing entity (e.g., client) for implementing the present invention, in accordance with example embodiments of the disclosure.

An exemplary embodiment of the present disclosure may include one or more management computing entities (e.g., servers) 2101, one or more networks, and one or more user computing entities (e.g., clients) 2201, as shown in FIGS. 21-22. Each of these components, entities, devices, systems, and similar words used herein interchangeably may be in direct or indirect communication with, for example, one another over the same or different wired or wireless networks. Additionally, while FIGS. 21-22 illustrate the various system entities as separate, standalone entities, the various embodiments are not limited to this particular architecture.

9.3 Exemplary Management Computing Entity

FIG. 21 provides a schematic 2100 of a management computing entity (e.g., server) 2101 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 2101 may also include one or more communications interfaces 2120 for communicating with various computing entities, such as by communicating data, content, information, and/or similar terms used herein interchangeably that can be transmitted, received, operated on, processed, displayed, stored, and/or the like. For instance, the management computing entity 2101 may communicate with user computing entities 2201 and/or a variety of other computing entities.

As shown in FIG. 21, in one embodiment, the management computing entity 2101 may include or be in communication with one or more processing elements 2105 (also referred to as processors, processing circuitry, and/or similar terms used herein interchangeably) that communicate with other elements within the management computing entity 2101 via a bus, for example. As will be understood, the processing element 2105 may be embodied in a number of different ways. For example, the processing element 2105 may be embodied as one or more complex programmable logic devices (CPLDs), microprocessors, multi-core processors, coprocessing entities, application-specific instruction-set processors (ASIPs), microcontrollers, and/or controllers. Further, the processing element 2105 may be embodied as one or more other processing devices or circuitry. The term circuitry may refer to an entirely hardware embodiment or a combination of hardware and computer program products. Thus, the processing element 2105 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 2105 may be configured for a particular use or configured to execute instructions stored in volatile or non-volatile media or otherwise accessible to the processing element 2105. As such, whether configured by hardware or computer program products, or by a combination thereof, the processing element 2105 may be capable of performing steps or operations according to embodiments of the present disclosure when configured accordingly.

In one embodiment, the management computing entity 2101 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 2110, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 2101 may further include or be in communication with volatile media (also referred to as volatile storage, memory, memory storage, memory circuitry and/or similar terms used herein interchangeably). In one embodiment, the volatile storage or memory may also include one or more volatile storage or memory media 2115, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 2105. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 2101 with the assistance of the processing element 2105 and operating system.

As indicated, in one embodiment, the management computing entity 2101 may also include one or more communications interfaces 2120 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 2101 may be configured to communicate via wireless external communication networks using any of a variety of protocols, such as general packet radio service (GPRS), Universal Mobile Telecommunications System (UNITS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zigbee, Bluetooth protocols, wireless universal serial bus (USB) protocols, and/or any other wireless protocol.

Although not shown, the management computing entity 2101 may include or be in communication with one or more input elements, such as a keyboard input, a mouse input, a touch screen/display input, motion input, movement input, audio input, pointing device input, joystick input, keypad input, and/or the like. The management computing entity 2101 may also include or be in communication with one or more output elements (not shown), such as audio output, video output, screen/display output, motion output, movement output, and/or the like.

As will be appreciated, one or more of the components of the management computing entity 2101 may be located remotely from other management computing entity 2101 components, such as in a distributed system. Furthermore, one or more of the components may be combined and additional components performing functions described herein may be included in the management computing entity 2101. Thus, the management computing entity 2101 can be adapted to accommodate a variety of needs and circumstances. As will be recognized, these architectures and descriptions are provided for exemplary purposes only and are not limiting to the various embodiments.

9.4 Exemplary User Computing Entity

A user may be an individual, a family, a company, an organization, an entity, a department within an organization, a representative of an organization and/or person, and/or the like. In one example, users may be carrier personnel, consignors/shippers, consignees/recipients, and/or the like. For instance, a user may operate a user computing entity (e.g., client) 2201 that includes one or more components that are functionally similar to those of the management computing entity 2101. FIG. 22 provides an illustrative schematic 2200 representative of a user computing entity 2201 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 2201 can be operated by various parties. As shown in FIG. 22, the user computing entity 2201 can include an antenna 2212, a transmitter 2204 (e.g., radio), a receiver 2206 (e.g., radio), and a processing element 2208 (e.g., CPLDs, microprocessors, multi-core processors, coprocessing entities, ASIPs, microcontrollers, and/or controllers) that provides signals to and receives signals from the transmitter 2204 and receiver 2206, respectively.

The signals provided to and received from the transmitter 2204 and the receiver 2206, respectively, may include signaling information in accordance with air interface standards of applicable wireless systems. In this regard, the user computing entity 2201 may be capable of operating with one or more air interface standards, communication protocols, modulation types, and access types. More particularly, the user computing entity 2201 may operate in accordance with any of a number of wireless communication standards and protocols, such as those described above with regard to the management computing entity 2101. In a particular embodiment, the user computing entity 2201 may operate in accordance with multiple wireless communication standards and protocols, such as 5G, UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 2201 may operate in accordance with multiple wired communication standards and protocols, such as those described above with regard to the management computing entity 2101 via a network interface 2220.

Via these communication standards and protocols, the user computing entity 2201 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 2201 can also download changes, add-ons, and updates, for instance, to its firmware, software (e.g., including executable instructions, applications, program modules), and operating system.

According to one embodiment, the user computing entity 2201 may include location determining aspects, devices, modules, functionalities, and/or similar words used herein interchangeably. For example, the user computing entity 2201 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 2201 position in connection with a variety of other systems, including cellular towers, Wi-Fi access points, and/or the like. Similarly, the user computing entity 2201 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 2201 may also comprise a user interface (that can include a display 2216 coupled to a processing element 2208) and/or a user input interface (coupled to a processing element 2208). For example, the user interface may be a user application, browser, user interface, and/or similar words used herein interchangeably executing on and/or accessible via the user computing entity 2201 to interact with and/or cause display of information from the management computing entity 2101, as described herein. The user input interface can comprise any of a number of devices or interfaces allowing the user computing entity 2201 to receive data, such as a keypad 2218 (hard or soft), a touch display, voice/speech or motion interfaces, or other input device. In embodiments including a keypad 2218, the keypad 2218 can include (or cause display of) the conventional numeric (0-9) and related keys (#, *), and other keys used for operating the user computing entity 2201 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 2201 can also include volatile storage or memory 2222 and/or non-volatile storage or memory 2224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 2201. As indicated, this may include a user application that is resident on the entity or accessible through a browser or other user interface for communicating with the management computing entity 2101 and/or various other computing entities.

In another embodiment, the user computing entity 2201 may include one or more components or functionality that are the same or similar to those of the management computing entity 2101, as described in greater detail above. As will be recognized, these architectures and descriptions are provided for exemplary purposes only and are not limiting to the various embodiments.

10. Illustrative Machine Learning Modules

The present invention may be implemented using one or more machine learning modules implementing one or more algorithms implemented in non-transitory storage medium having program code stored thereon, the program code executable by one or more processors, as described above. The following description describes in detail some of the illustrative machine learning algorithms useful for implementing some embodiments of the present invention.

Figure 23:
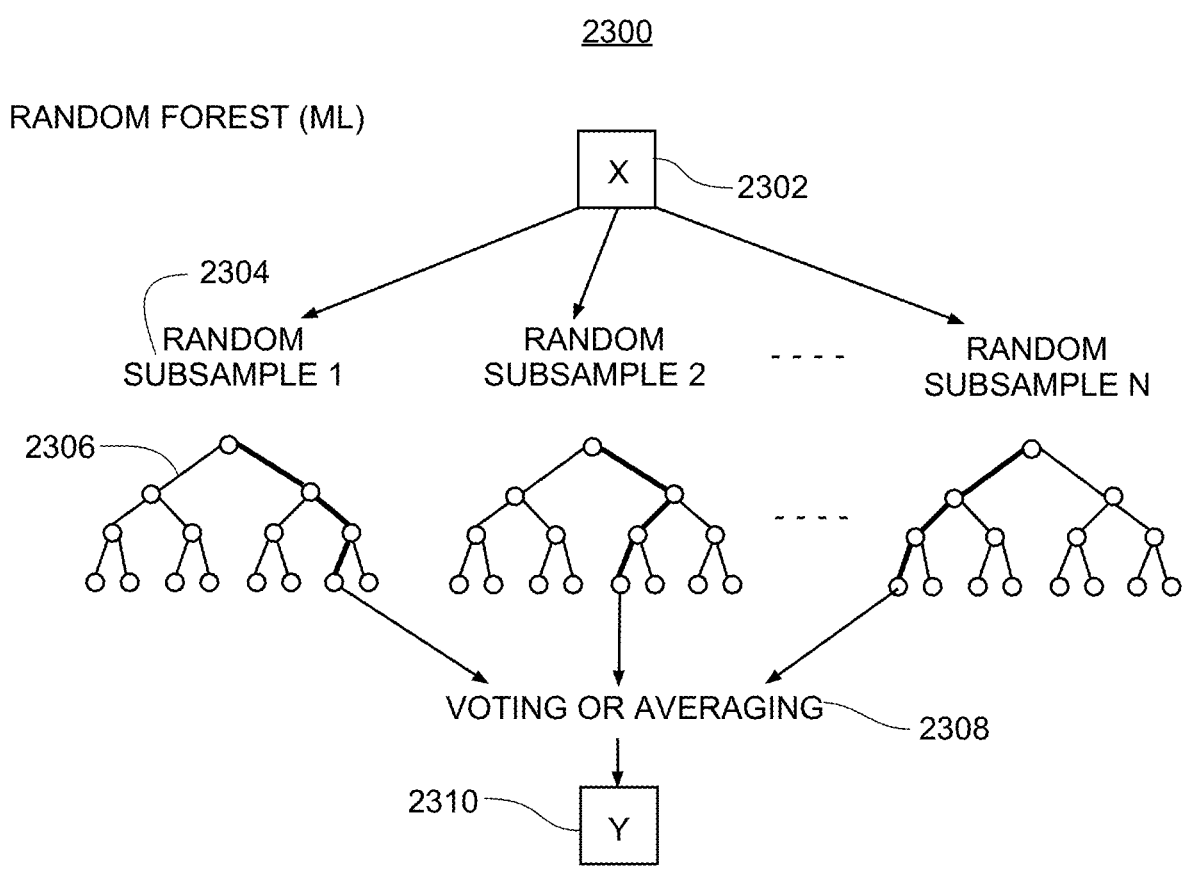
FIG. 23 shows an illustrative block diagram for a machine learning algorithm for implementing arbitration and selection of info agents and action agents, in accordance with another embodiment of the invention.

FIG. 23 shows an illustrative diagram 2300 for a machine learning algorithm used to implement masterbot arbitration and evaluation of information agents and action agents, in accordance with sample embodiments of the invention. In one embodiment, the machine learning algorithm comprises a random forest algorithm, one illustrative machine learning algorithm. Random forest algorithms use a multitude of decision tree predictors 2306 such that each decision tree 2306 depends on the values of a random subset 2304 of the training data 2302, which minimizes the chances of overfitting to the training data set. The decision tree predictors are voted or averaged 2308 to obtain the prediction 2310 of the random forest algorithm. In one embodiment, the random forest algorithm is implementation as described in Leo Breiman, *Random Forests*, Machine Learning, 45, 5-32, 2001, Kluwer Academic Publishers, Netherlands, available at doi.org/10.1023/A:1010933404324. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

As noted, embodiments of devices and systems (and their various components) described herein can employ artificial intelligence (AI) to facilitate automating one or more features described herein (e.g., action agent selection). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier may map an input attribute vector, $z=(z_1, z_2, z_3, z_4, \ldots, z_n)$, to a confidence that the input belongs to a class, as by $f(z)=\text{confidence(class)}$. Such classification may employ a probabilistic and/or statistical-based analysis (e.g., factoring into the analysis utilities and costs) to determine an action to be automatically performed. Another example of a classifier that can be employed is a support vector machine (SVM). The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches including, e.g., naive Bayes, Bayesian networks, decision trees, neural networks, fuzzy logic models, and/or probabilistic classification models, providing different patterns of independence, can be employed. Classification as used herein also is inclusive of statistical regression that is utilized to develop models of priority.

Figure 24:
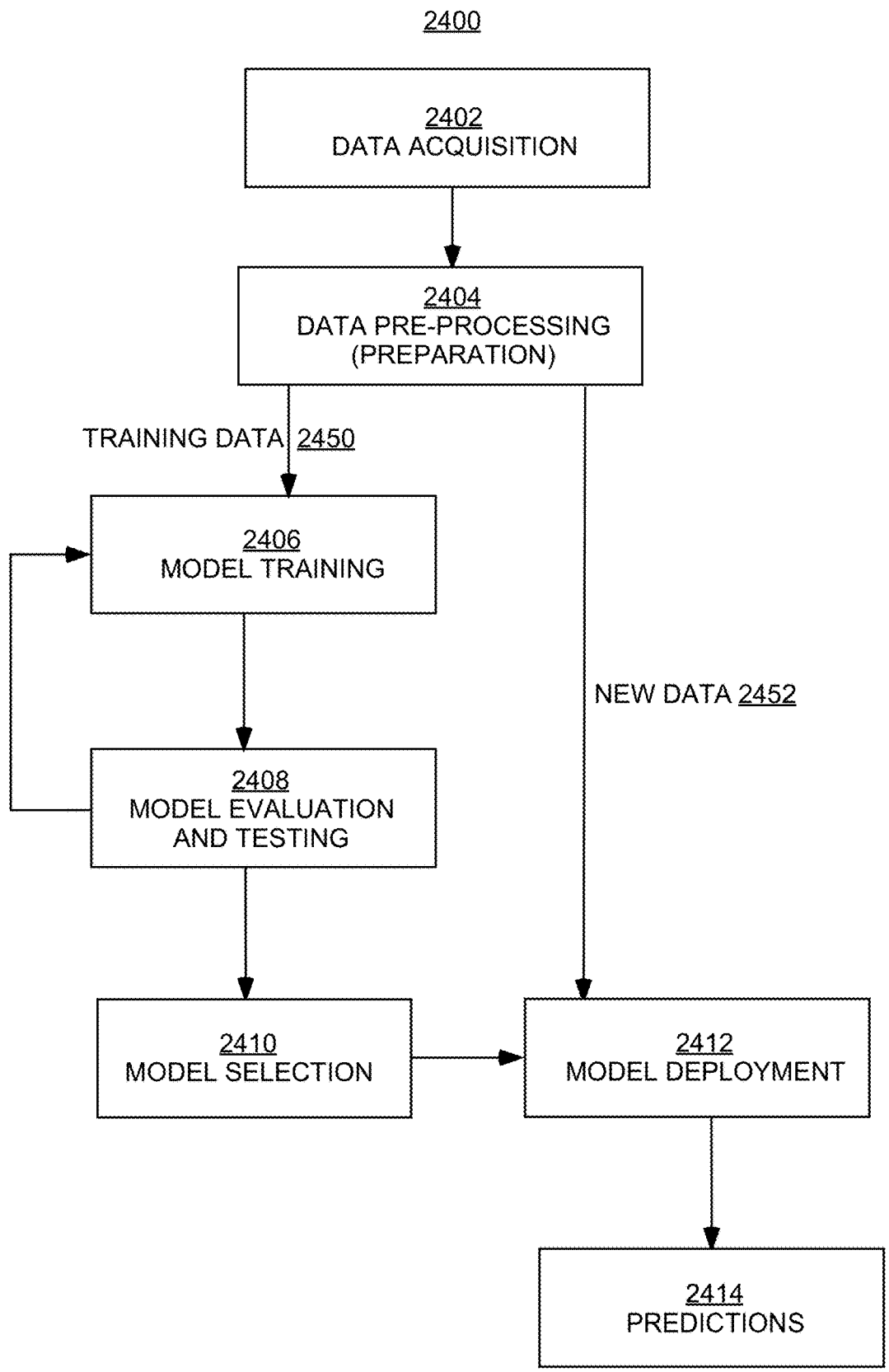
FIG. 24 shows an example flow diagram for training the machine learning algorithm, in accordance with example embodiments of the disclosure.

FIG. 24 shows an exemplary flow diagram 2400 for training the machine learning (ML) algorithms, which are utilized in training the masterbot to evaluate and arbitrate among the information agents and action agents, in accordance with example embodiments of the present invention. The training process begins at step 2402, with data acquisition. At step 2404, the acquired data is pre-processed (known as data preparation). At step 2406, the model is trained using training data 2450. At step 2408, the model is evaluated and tested, and further refinements to the model are fed back into step 2406. At step 2410, the optimal model parameters are selected. At step 2412, the model is deployed. New data 2452 can now be used by the deployed model to make predictions 2414.

A starting point for any machine learning method such as used by the machine learning component above is a documented dataset containing multiple instances of system inputs and correct outcomes (e.g., the training data). This data set can be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. The quality of the output of the machine learning system output depends on (a) the pattern parameterization, (b) the learning machine design, and (c) the quality of the training database. These components can be refined and optimized using various methods. For example, the database can be refined by adding datasets for new documented user utterances. The quality of the database can be improved, for example, by populating the database with cases in which the user utterances were correctly recognized. In one embodiment, the database includes data, for example, of sample conversations with end user utterances and optimal action agent selection, which can assist in the evaluation of a trained system.

Figure 25:
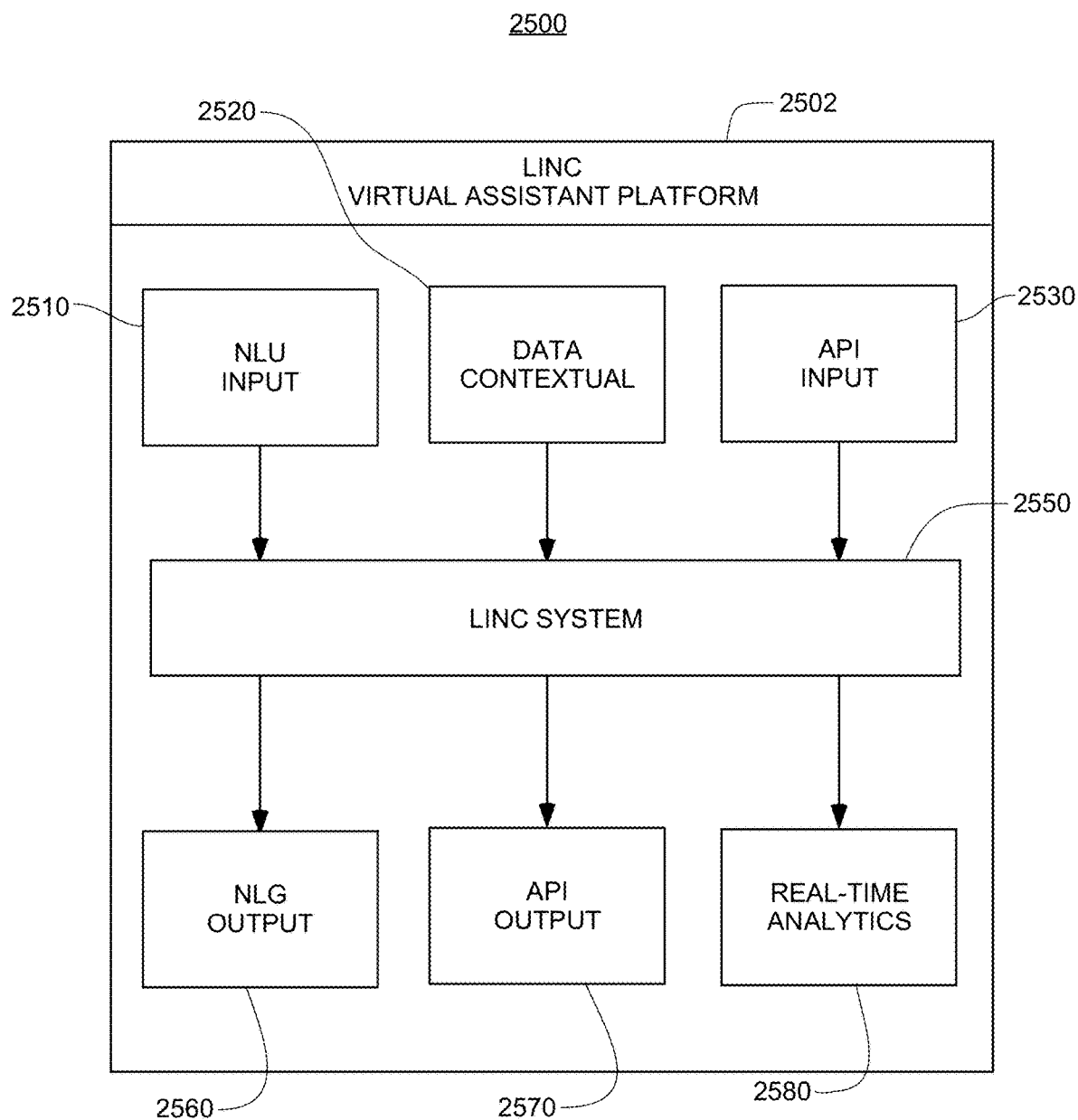
FIG. 25 shows an illustrative block diagram for a LINC virtual assistant platform, in accordance with another embodiment of the invention.

FIG. 25 shows an illustrative block diagram 2500 for a LINC virtual assistant platform 2502, in accordance with another embodiment of the invention. In some embodiments, LINC platform 2502 may receive NLU input 2510, contextual data 2520, and API input data 2530. The received data may be processed by the LINC server 2550, and stored in the cloud for later use, analysis, playback, and predictions. The LINC server 2550 may provide NLG output 2560, API output 2570, and/or real-time analytics 2580 to a plurality of end user devices over the network.

11. Benefits of the Present Invention

The statements in this section may serve to help understand the invention and its benefits, but the benefits of the present invention are not limited to those described herein. Other benefits of the present invention include any benefits inherent in the structures described in this disclosure.

Figure 26:
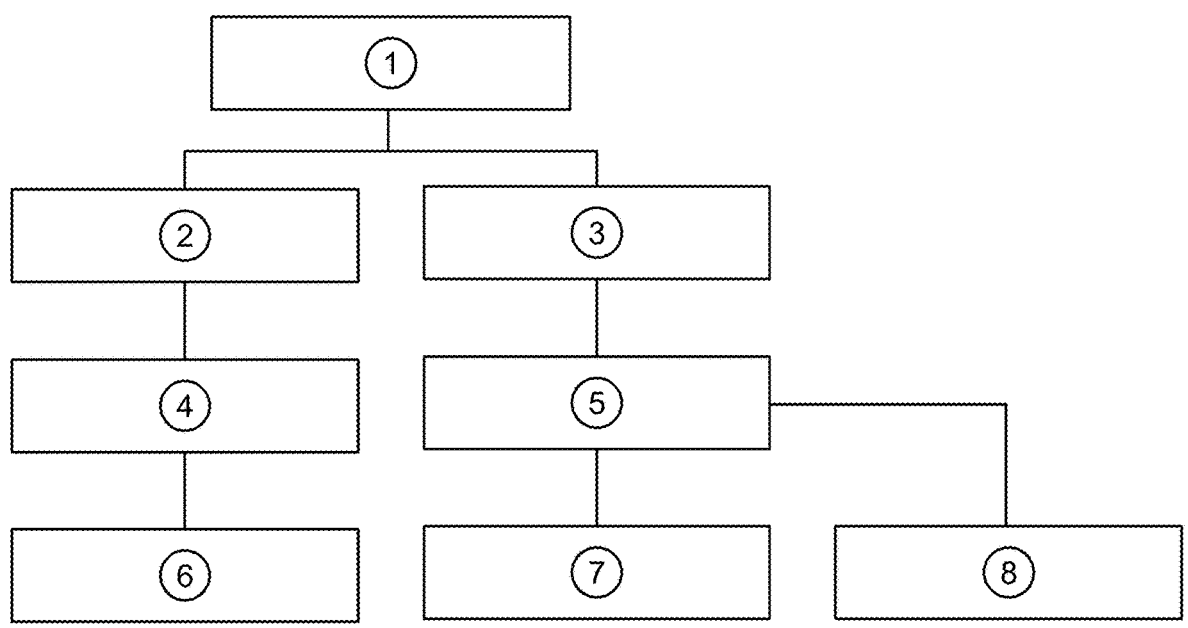
FIG. 26 shows a diagram of an illustrative prior art decision-tree approach for implementing natural language systems.

In a conventional approach of building a new service, developers must craft dialog flow and programming logic. Traditionally, to build a single service chatbot, developers have to craft a decision tree (e.g., FIG. 26) or finite state machine to code up all the possible information management scenarios. For example, FIG. 26 shows a diagram 2600 of an illustrative prior art decision-tree approach for implementing natural language systems.

The approach disclosed in this invention dramatically simplifies the work to implement a single service for a developer. The virtual assistant platform utilizes domain optimized ontology and on-platform data to support a large collection of data inputs. The developer only needs to mark these data inputs as prerequisite info agents, using for example a declarative language, and the platform will automatically manage all the necessary conversations to ensure the information values of these chosen inputs are available for the developer to leverage. This greatly reduces the effort of bot implementation from weeks (or months) to hours.

Figure 28:
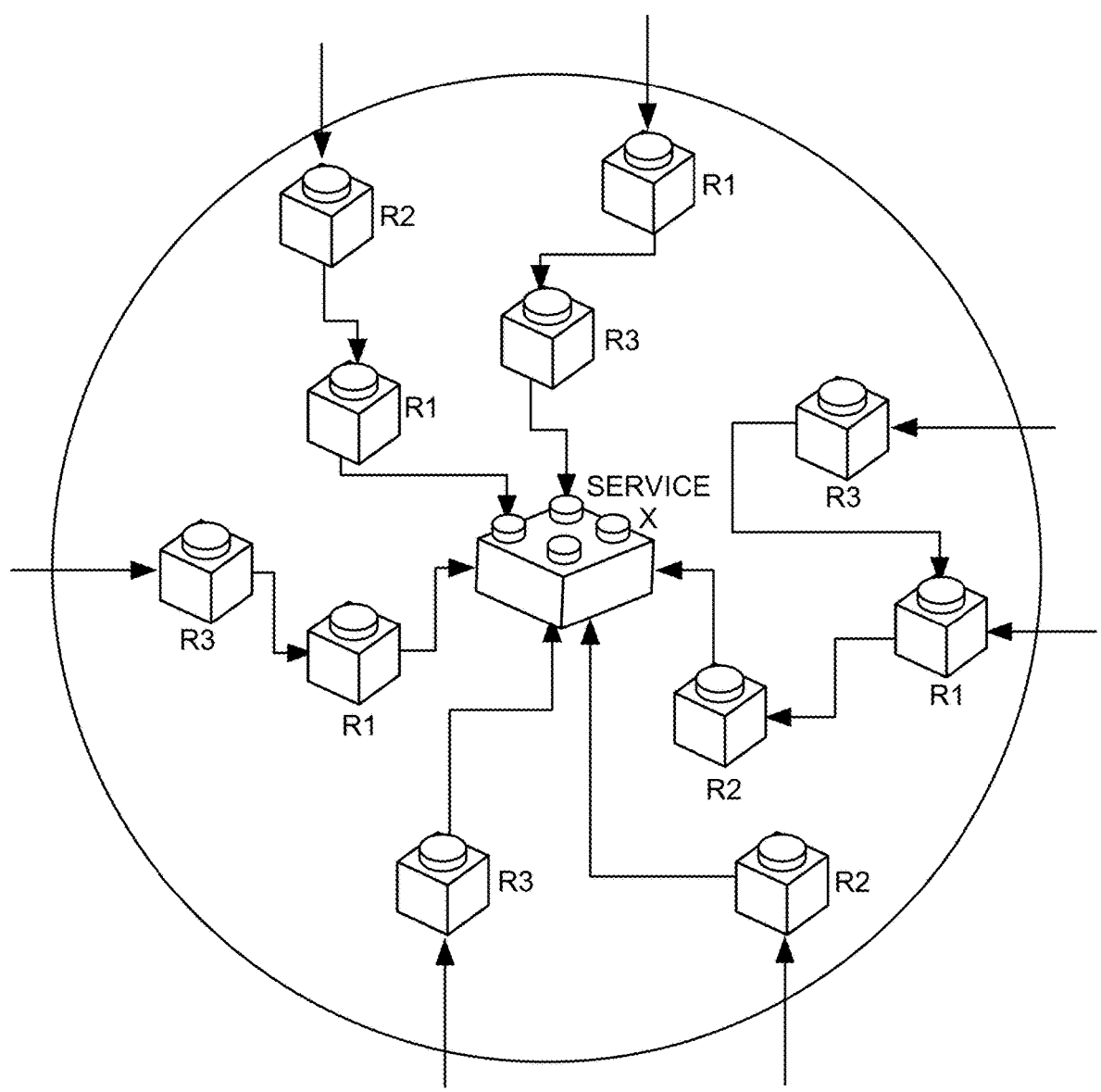
FIG. 28 shows a conceptual architecture diagram showing how a new service may be implemented by leveraging and reusing a large number of existing building blocks or agents.

For example, shown in FIG. 28 is a conceptual architecture diagram 2800 showing how a new service (for example, Service X) may be implemented by leveraging and reusing a large number of existing building blocks or agents R1, R2, R3, etc., as prerequisites and rearranging them using a declarative programming language without extensive development time. A new service can be assembled quickly by specifying the necessary info agents(s) R1, R2, R3, etc., which are likely to be pre-built and available in the platform. The virtual assistant platform will automatically handle all of the natural language understanding (NLU) information retrieval tasks from the conversation, making inferences based on existing context as well as conducting a service using the best approach (e.g., connected info agents). The entire dialog flow would be automated, and the developer's job is to focus on the actual service logic, which is conversation independent and high-level.

Figure 27:
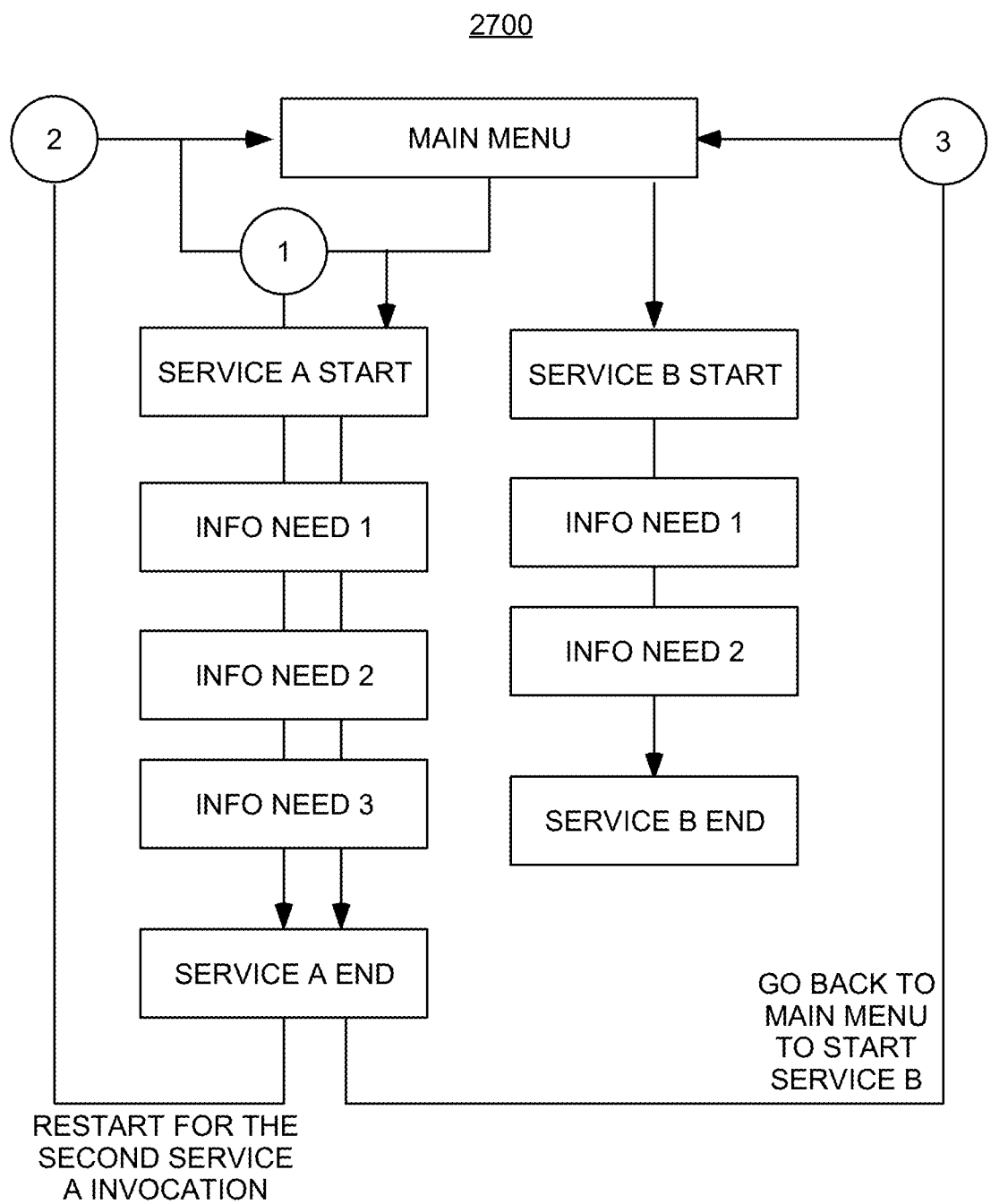
FIG. 27 shows a diagram of an illustrative prior art menu-driven approach for implementing multi-service virtual assistants.

For a multi-service use case implemented in the conventional approach, the complexity quickly multiplies. In the conventional approach to managing multiple services, there is a rigid and laborious "main menu" like experience. For example, FIG. 27 shows a diagram 2700 of an illustrative prior art menu-driven approach for implementing multi-service virtual assistants. Disadvantages include the topic-based top-level triaging among service-specific dialogue flows; requirement to follow strict dialogue flows to execute individual services; using a rigid set of control functions (e.g., start again, repeat, main menu, etc.) to navigate between services; and often no support for switching topics amid a conversation.

That is, building a multi-service AI agent is exponentially more challenging than building a single service AI agent.

The conventional approach leverages decision trees to explicitly design out the conversation flow. To build an AI agent that can manage 'n' services, each service requiring 'm' inputs to be surveyed through conversation, with conventional dialogue builders, the developer needs to craft at a minimum (n*m) conversations, and when attempting to support flexible conversations where an end user can switch topic amid service conversations, the developer needs to craft on the order of ($n^m$) conversations.

In another words, the complexity involved in designing the conversational flow using the conventional approach is prohibitive for the AI agent to gain new skills (i.e., new services) quickly and efficiently.

One benefit of the disclosed invention is an AI agent solution that solves this challenge. With the present invention, the developer only needs to spend (n) effort to teach the AI agent (n) services, and the resulting AI agent can seamlessly manage ($n^m$) conversation possibilities, as described herein.

In addition to exponentially reducing the development effort in teaching the AI agent new services, the present invention also:

Has greater conversation intelligence, i.e., generates more natural and versatile conversations to deliver a service, as well as navigation across services within a conversation.

Enables a large number of developers to work independently and in parallel to teach a single AI agent different services, where different developers can teach the AI agent different services and they do not have to collaborate deeply as the solution manages the different service gains by the single AI agent to work seamlessly together in one conversation or across conversations.

Additionally, the present invention allows for a fluid, dynamic conversation between the bot and the end user using a small number of conversation building blocks that can be leveraged to create an endless variety of conversations. The platform allows users to conduct a natural conversation, change topics midstream, and navigate across multiple services seamlessly in the same conversation.

Figure 29:
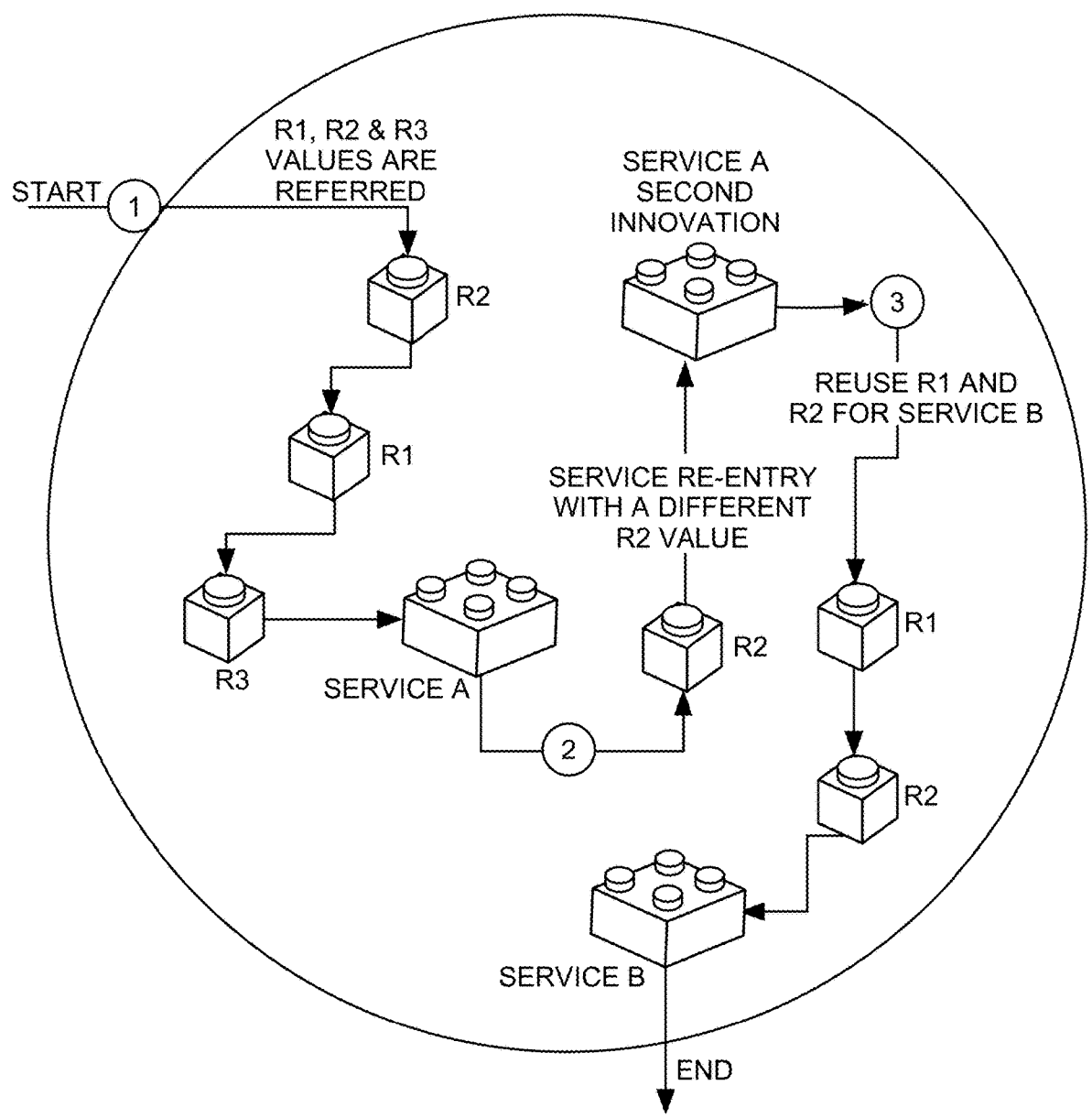
FIG. 29 shows a conceptual architecture diagram showing how for a multiple service use case, the virtual assistant platform automatically facilitates the discovering and triaging of action agents, and how info agents can be shared and re-used.

For example, shown in FIG. 29 is a conceptual architecture diagram 2900 showing how for a multiple service use case, the masterbot automatically uses natural language understanding (NLU), policy management, and dialog management to facilitate the discovering and triaging of action agents, and how info agents can be shared and re-used. This greatly improves the user experience, especially for multi-service conversation scenarios where users might desire to switch topics midstream. By leveraging and reusing a large number of existing building blocks or agents R1, R2, R3, etc., multiple services, such as Service A, Service A (Second Invocation), Service B, etc. can be seamlessly activated during a single conversation, providing a natural experience for end users.

Lastly, another conventional approach to building conversation systems utilizes a frame-based (or frame-slot) approach for conversation interactions. A frame is mapped to an intent and defined as a structure with slots of data types. Once all the slots are filled, a frame is ready. The dialog system applies natural language understanding to figure out slots and many implementations can automatically generate follow-up questions to attempt to fill the slot. Some key differences from the present invention include, but are not limited to:

No need for data annotation/labeling and model training for the relationship between frames and slots. This step is often laborious, needs to be done for each frame, and difficult to render highly accurately. By comparison, info agents can be specified for different action agents, and at runtime, shared between them. The NLU capability is separated into a different module and implemented in a generic and extensible way.

A slot is a passive specification of data requirements, while an info agent is implemented to be autonomous and plays an active role of information seeker. Info agents have the ability to infer using contextual data or survey the end user by asking different questions.

Info agents have inference capabilities between themselves, whereas slots do not.

Action agents are more versatile than frames. Firstly, action agents can choose to set values for relevant info agents for future usage; this enables multiple action agents to work seamlessly. Secondly, multiple action agents can be connected via follow-up triggering condition(s) to accomplish a more flexible conversation flow. In a standard frame slot design, each frame is independent of each other.

In short, the present invention provides many benefits over conventional approaches to conversation bots.

12. Conclusions

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include, but are not limited to, recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A system for a virtual assistant platform, comprising:
   at least one memory device that stores computer-executable instructions; and
   at least one processor configured to access the memory device, wherein the processor is configured to execute the computer-executable instructions to implement:
      a plurality of information agents to obtain at least one information value from a parsed user input and/or contextual data from one or more contextual data sources, wherein the parsed user input is generated from one or more utterances received from a user;
      a plurality of action agents to perform one or more actions in response to the parsed user input, the contextual data, and/or the at least one information value; and
      at least one masterbot to arbitrate an activation of the plurality of information agents and the plurality of action agents, the masterbot comprising:
         an action agent selector module to select an appropriate action agent;
         a prerequisite validator module to validate that one or more prerequisite conditions of the selected action agent have been met, and to activate one or more specific information agents with a relationship connection to the selected action agent to obtain one or more information values when the one or more prerequisite conditions have not been met; and
         an action invocation module to perform one or more selected actions of the selected action agent.

2. The system of claim 1, wherein at least one set-value connection interrelates a given action agent and a given information agent via at least one set-value action, wherein the set-value action for the given action agent is used to set an information value for the given information agent which is later used by the given information agent.

3. The system of claim 1, wherein at least one inference connection interrelates two information agents, wherein the inference connection interrelates the two information agents amongst themselves which determine when a given information agent activates one or more related information agents in order to fulfill one or more information values of the given information agent which are later used by the given information agent.

4. The system of claim 1, wherein at least one prerequisite connection interrelates at least one information agent and at least one action agent, and wherein the prerequisite connection activates one or more prerequisite information agents to fulfill one or more prerequisite conditions for a given action agent.

5. The system of claim 1, wherein at least one of the plurality of information agents is adapted to understand the parsed user input from the user to extract the information value directly from the parsed user input.

6. The system of claim 1, wherein at least one of the plurality of information agents is adapted to infer the information value from the parsed user input, wherein the inferring is activated in response to determining that a given information agent cannot obtain the information value by understanding the parsed user input directly.

7. The system of claim 6, wherein at least one of the plurality of information agents is adapted to infer the information value by accessing one or more contextual data sources for the contextual data and is adapted to infer the information value from the parsed user input and the contextual data.

8. The system of claim 7, wherein at least one of the plurality of information agents is adapted to query the user for the information value by generating a natural language query using a natural language generation (NLG) module, wherein the querying is activated in response to determining that the information agent cannot obtain the information value by understanding the parsed user input or inferring the information value.

9. The system of claim 8, wherein at least one of the plurality of information agents is adapted to obtain the information value by activating one or more other information agents, wherein the one or more other information agents are activated in response to determining that the at least one information agent cannot obtain the information value by understanding the parsed user input or inferring the information value.

10. The system of claim 1, wherein at least one of the plurality of action agents performs the one or more actions by triggering one or more internal services to perform one or more services.

11. The system of claim 10, wherein at least one of the plurality of action agents performs the one or more actions by accessing one or more Application Programming Interface (API) gateways to external services to perform the one or more services.

12. The system of claim 1, wherein the system activates one or more of the information agents in order to meet one or more prerequisite connections for a given action agent, wherein the given action agent utilizes the one or more activated information agents to obtain one or more information values needed to perform the one or more actions.

13. The system of claim 1, wherein at least one of the plurality of action agents is adapted to generate a natural language reply to the user using a natural language generation (NLG) module.

14. The system of claim 1, wherein at least one of the plurality of action agents is adapted to change a system state.

15. The system of claim 1, wherein the masterbot evaluates a performance of the plurality of information agents and the plurality of action agents using machine learning to adjust the activation of the information agents and the action agents.

16. The system of claim 1, wherein the masterbot generates a response to the user using a natural language generation (NLG) module from information supplied by the information agents and/or the action agents.

17. A non-transitory, computer-readable medium storing program code for a multi-service virtual assistant platform which, when executed by a processor, cause the processor to perform computer-executable operations to:
  obtain at least one information value from a parsed user input and/or contextual data from one or more contextual data sources using a plurality of information agents, wherein the parsed user input is generated from one or more utterances received from a user;
  perform one or more actions in response to the parsed user input, the contextual data, and/or the at least one information value using a plurality of action agents; and
  arbitrate an activation of the plurality of information agents and the plurality of action agents, further computer-executable operations to:
    select an appropriate action agent;
    validate that one or more prerequisite conditions of the selected action agent have been met, and activate one or more specific information agents with a relationship connection to the selected action agent to obtain one or more information values when the one or more prerequisite conditions have not been met; and
    perform one or more selected actions of the selected action agent.

18. A computer-implemented method for a multi-service virtual assistant platform, comprising:
  obtaining at least one information value from a parsed user input and/or contextual data from one or more contextual data sources using a plurality of information agents, wherein the parsed user input is generated from one or more utterances received from a user;
  performing one or more actions in response to the parsed user input, the contextual data, and/or the at least one information value using a plurality of action agents; and
  arbitrating an activation of the plurality of information agents and the plurality of action agents by:
    selecting an appropriate action agent;
    validating that one or more prerequisite conditions of the selected action agent have been met, and activating one or more specific information agents with a relationship connection to the selected action agent to obtain one or more information values when the one or more prerequisite conditions have not been met; and
    performing one or more selected actions of the selected action agent.

19. The computer-implemented method of claim 18, wherein at least one set-value connection interrelates a given action agent and a given information agent via at least one set-value action, wherein the set-value action for the given action agent is used to set an information value for the given information agent which is later used by the given information agent.

20. The computer-implemented method of claim 18, wherein at least one inference connection interrelates two information agents, wherein the inference connection interrelates the two information agents amongst themselves which determine when a given information agent activates one or more related information agents in order to fulfill one or more information values of the given information agent which are later used by the given information agent.

* * * * *